(12) United States Patent
Fukuen

(10) Patent No.: US 10,266,661 B2
(45) Date of Patent: Apr. 23, 2019

(54) POLYPHENYLENE ETHER POWDER AND PRODUCTION METHOD

(71) Applicant: ASAHI KASEI KABUSHIKI KAISHA, Chiyoda-ku, Tokyo (JP)

(72) Inventor: Shinichi Fukuen, Tokyo (JP)

(73) Assignee: ASAHI KASEI KABUSHIKI KAISHA, Chiyoda-ku, Tokyo (JP)

(*) Notice: Subject to any disclaimer, the term of this patent is extended or adjusted under 35 U.S.C. 154(b) by 0 days.

(21) Appl. No.: 15/475,453

(22) Filed: Mar. 31, 2017

(65) Prior Publication Data
US 2018/0118894 A1    May 3, 2018

(30) Foreign Application Priority Data
Oct. 28, 2016   (JP) .................. 2016-212282

(51) Int. Cl.
*C08J 3/14*    (2006.01)
*C08G 65/40*    (2006.01)

(52) U.S. Cl.
CPC .............. *C08J 3/14* (2013.01); *C08G 65/40* (2013.01); *C08J 2371/12* (2013.01)

(58) Field of Classification Search
CPC ..... C08L 2205/02; C08L 2371/12; C08L 3/14
See application file for complete search history.

(56) References Cited

U.S. PATENT DOCUMENTS

2011/0198773 A1    8/2011  Chakraborty et al.

FOREIGN PATENT DOCUMENTS

| CN | 101983987 B | 1/2013 |
|---|---|---|
| JP | S62172022 A | 7/1987 |
| JP | 2000167827 A | 6/2000 |
| JP | 2007532357 A | 11/2007 |
| JP | 4152521 B2 | 9/2008 |
| JP | 2010001411 A | 1/2010 |
| JP | 2010047662 A | 3/2010 |
| JP | 5066634 B2 | 11/2012 |
| JP | 5119373 B2 | 1/2013 |

*Primary Examiner* — Alexandre F Ferre
(74) *Attorney, Agent, or Firm* — Kenja IP Law PC

(57) ABSTRACT

Provided are a polyphenylene ether powder that exhibits low susceptibility to pulverization due to particle collisions, suppressed particle flushability, and excellent handleability, and a method for producing this polyphenylene ether powder. The polyphenylene ether powder includes one or more polyphenylene ether particles having an aspect ratio (DL/DS), expressing a ratio of a major axis diameter (DL) and a minor axis diameter (DS) of an individual particle, of 2.0 to 7.0.

15 Claims, 1 Drawing Sheet

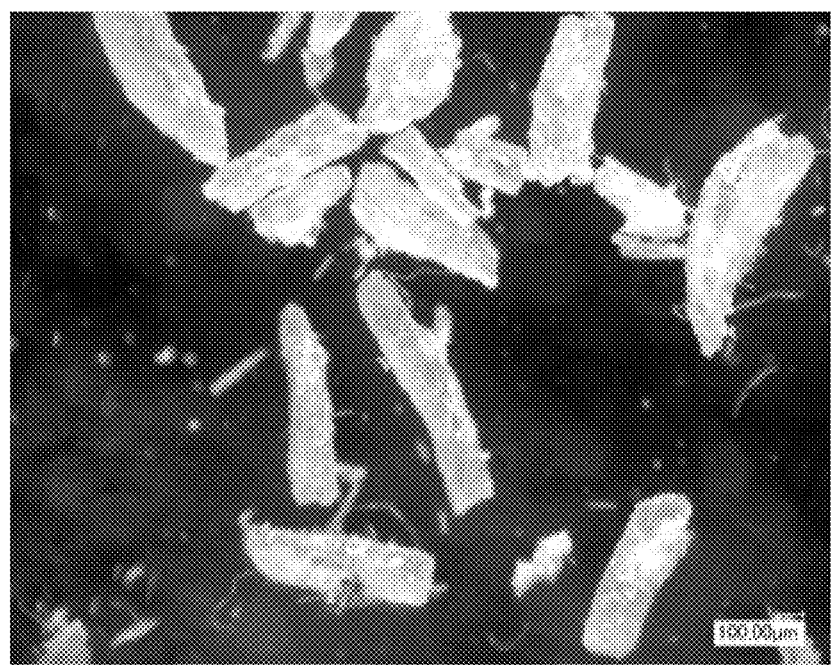

POLYPHENYLENE ETHER POWDER AND PRODUCTION METHOD

CROSS-REFERENCE TO RELATED APPLICATIONS

This application claims priority to and the benefit of Japanese Patent Application No. 2016-212282 filed on Oct. 28, 2016, the entire contents of which are incorporated herein by reference.

TECHNICAL FIELD

This disclosure relates to polyphenylene ether having a novel shape and to a method for producing this polyphenylene ether.

BACKGROUND

Particles of a resin such as polyphenylene ether are obtained through a polymerization step of emulsion polymerization, suspension polymerization, solution polymerization, or the like, followed by a particle precipitation step, dry grinding of a resin material, and so forth. Accordingly, resin particles are generally produced with an undefined or spherical shape.

Conventionally, resin particles of various different forms have been developed for a variety of objectives such as an objective of improving mechanical properties and handleability of resin particles, an objective of suppressing particle fragmentation due to particle collisions during mixing, stirring, or air conveyance, an objective of improving cleaning properties, an objective of improving powder handleability in a hopper during melt-kneading, and an objective of improving slip properties of cosmetics.

For example, one problem that may be experienced in handling of powder in a hopper for melt-kneading or the like is that feeding of the powder using a powder feeding device formed by a weighing feeder may cause flushing of the powder (i.e., a phenomenon may occur in which the powder forms a liquid-like state and passes straight through a screw part of the powder feeding device). This flushing results in poorer feeding accuracy, and may also cause the fed material to pass through the screw at once. In continuous operation of a weighing feeder, operation is often performed at reduced powder feeding device capability to prevent flushing. However, this also reduces productivity.

Furthermore, when a powder having a high fine content is used, this may cause problems such as reduced yield due to fine powder scattering, malfunction due to encroachment into an extruder or the like, and filter blocking from a drying step to an air conveyance step.

The following describes examples of developments that have been made in relation to resin particles of specific shapes such as mentioned above. PTL 1 reports highly spherical particles of polyphenylene ether. Moreover, a technique for producing spherical polyphenylene ether has been proposed that involves adding an aqueous solution of a water-soluble organic polymer to an organic solvent solution containing dissolved polyphenylene ether, and then performing deliquoring treatment while maintaining the polyphenylene ether in a dispersed state (PTL 2). Furthermore, particles having cracks have been proposed, and it has also been proposed that a shape capable of trapping fine powder exhibits an inhibitive effect with respect to bridging (PTL 3).

PTL 4 to 9 disclose compression granulation of polyphenylene ether powder to increase the loose apparent specific gravity of the polyphenylene ether powder with the aim of improving handleability. These techniques focus on adjusting particle size, reducing fine content, and improving efficiency of powder transport, storage, and feeding to an extruder through compression and grinding of polyphenylene ether powder.

CITATION LIST

Patent Literature

PTL 1: JP 2010-47662 A
PTL 2: JP S62-172022 A
PTL 3: JP 2010-1411 A
PTL 4: JP 2007-532357 A
PTL 5: JP 5119373 B
PTL 6: JP 5066634 B
PTL 7: JP 2000-167827 A
PTL 8: JP 4152521 B
PTL 9: CN 101983987 B

SUMMARY

As described above, particle forms that have been obtained through the techniques disclosed up to this point are a spherical particle form and a particle form obtained by forming a crack at one location in a sphere-shaped particle. These particle forms do not provide sufficient improvement in relation to suppressing flushing.

Spherical resin particles described in PTL 1 have a small average particle diameter and a high fine content. Therefore, further improvement is required in terms of handleability.

In the technique described in PTL 2, a problem of gel or contaminant formation in processing may occur due to the water-soluble organic polymer that is added to the system remaining in the produced polyphenylene ether powder in an amount of approximately 3% to 4%.

In the resin particles having cracks described in PTL 3, fine powder that is produced becomes trapped in the cracks. However, since the fine content is high, further improvement is required in terms of handleability. Moreover, the technique disclosed in PTL 3 is limited to precipitation polymerization. Although precipitation polymerization is beneficial in terms of ease of production and ease of molecular weight adjustment, production by solution polymerization is preferable for obtaining polyphenylene ether having excellent color.

The techniques in PTL 4 to 9 require a granulator and result in a more complicated process. Moreover, PTL 4 to 9 do not provide any details in relation particle shape.

Accordingly, an objective of the present disclosure is to provide polyphenylene ether that exhibits suppressed flushability, low susceptibility to pulverization, and good handleability, and also to provide a method for producing this polyphenylene ether.

As a result of extensive and diligent research in relation to the conventional problems described above, a polyphenylene ether powder that contains elongated polyphenylene ether particles and that exhibits suppressed flushability, low susceptibility to pulverization, and good handleability, and a method for producing this polyphenylene ether powder were discovered by, in precipitation of polyphenylene ether, using a solvent having a specific SP value as a poor solvent for polyphenylene ether and controlling the temperature of liquid in a precipitation tank.

Specifically, this disclosure provides the following.

[1] A polyphenylene ether powder comprising one or more polyphenylene ether particles having an aspect ratio (DL/DS), expressing a ratio of a major axis diameter (DL) to a minor axis diameter (DS) of an individual particle, of 2.0 to 7.0.

[2] The polyphenylene ether powder according to [1], wherein the polyphenylene ether particles having an aspect ratio of 2.0 to 7.0 have a content of at least 70%.

[3] The polyphenylene ether powder according to [1] or [2] having an average particle diameter of 200 μm to 1000 μm.

[4] The polyphenylene ether powder according to any one of [1] to [3], wherein in an individual particle of the polyphenylene ether powder, the volume of pores exceeding 6.5 μm in diameter is 0% to 1.5% of total volume.

[5] A method for producing the polyphenylene ether powder according to any one of [1] to [4], comprising mixing a polyphenylene ether solution containing polyphenylene ether and a good solvent for polyphenylene ether with a poor solvent for polyphenylene ether at −80° C. to 30° C. to precipitate polyphenylene ether particles and form a slurry, wherein the poor solvent for polyphenylene ether includes a poor solvent having a solubility parameter value of less than 9 $(cal/cm^3)^{1/2}$ (i.e., 18.41 $(J/cm^3)^{1/2}$).

[6] The method according to [5], wherein the good solvent for polyphenylene ether is at least one selected from the group consisting of benzene, toluene, and xylene.

[7] The method according to [5] or [6], wherein the poor solvent having a solubility parameter value of less than 9 $(cal/cm^3)^{1/2}$ (i.e., 18.41 $(J/cm^3)^{1/2}$) is at least one selected from hydrocarbon solvents and ether solvents.

[8] The method according to any one of [5] to [7], wherein the poor solvent having a solubility parameter value of less than 9 $(cal/cm^3)^{1/2}$ (i.e., 18.41 $(J/cm^3)^{1/2}$) is at least one selected from hydrocarbon solvents.

[9] The method according to any one of [5] to [8], wherein 100 mass % of the polyphenylene ether solution has a polyphenylene ether concentration of 20 mass % to 50 mass %.

[10] The method according to any one of [5] to [9], wherein a poor solvent having a solubility parameter value of at least 9 $(cal/cm^3)^{1/2}$ (i.e., 18.41 $(J/cm^3)^{1/2}$) is contained in an amount of 0.05 mass % to 10 mass % relative to all solvents when a total amount of good and poor solvents is taken to be 100 mass %.

[11] The method according to [10], wherein the poor solvent having a solubility parameter value of at least 9 $(cal/cm^3)^{1/2}$ (i.e., 18.41 $(J/cm^3)^{1/2}$) is at least one selected from the group consisting of methanol, ethanol, isopropanol, acetone, methyl ethyl ketone, and water.

[12] The method according to any one of [5] to [11], wherein the mixing is performed by stirring through rotation of an impeller at a tip speed of 1.7 m/s to 7.0 m/s.

[13] The method according to any one of [5] to [12], wherein the mixing is performed by adding the polyphenylene ether solution and the poor solvent for polyphenylene ether to an initially charged liquid that is a mixed liquid of a good solvent for polyphenylene ether and a poor solvent for polyphenylene ether, and a mass ratio of the poor solvent having a solubility parameter value of less than 18.41 $(J/cm^3)^{1/2}$ included in the poor solvent that is added relative to the good solvent in the polyphenylene ether solution that is added (added poor solvent having solubility parameter value of less than 18.41 $(J/cm^3)^{1/2}$/good solvent in added polyphenylene ether solution) is in a range of 0.9 to 4.0.

According to the present disclosure, it is possible to provide polyphenylene ether that exhibits suppressed flushability, low susceptibility to pulverization, and good handleability, and it is also possible to provide a method for producing this polyphenylene ether.

BRIEF DESCRIPTION OF THE DRAWING

In the accompanying drawing,
FIG. 1 is an optical micrograph of a polyphenylene ether powder obtained through a production method that is one aspect of a present embodiment.

DETAILED DESCRIPTION

The following provides a detailed description of a presently disclosed embodiment (hereinafter, referred to as "the present embodiment"). The present embodiment described below is provided as an illustrative example to facilitate explanation of the present disclosure. However, the present disclosure is not limited to the present embodiment and can be implemented with appropriate alterations within the essential scope thereof.

[Polyphenylene Ether Powder]

A polyphenylene ether powder of the present embodiment contains one or more polyphenylene ether particles having an aspect ratio (DL/DS), expressing a ratio of a major axis diameter (DL) to a minor axis diameter (DS) of an individual particle, of 2.0 to 7.0. Through inclusion of polyphenylene ether particles having an aspect ratio in the range set forth above, flushing can be suppressed, and a polyphenylene ether powder having low susceptibility to pulverization and good handleability can be obtained. From a viewpoint of effectively suppressing flushing, it is more preferable that the polyphenylene ether powder contains one or more polyphenylene ether particles having an aspect ratio of 3.0 to 5.0.

The aspect ratio of a polyphenylene ether particle is a value measured by a measurement method described in the EXAMPLES section further below.

In the polyphenylene ether powder of the present embodiment, the content of polyphenylene ether particles having an aspect ratio of 2.0 to 7.0 is preferably at least 70%, and more preferably at least 78%.

Moreover, in the polyphenylene ether powder of the present embodiment, the content of polyphenylene ether particles having an aspect ratio of 3.0 to 5.0 is preferably at least 65%, and more preferably at least 68%.

As a result of polyphenylene ether particles having an aspect ratio in the ranges set forth above being in the content ranges set forth above, flushing and pulverization can be further suppressed, and handleability can be further improved.

The content of polyphenylene ether particles having a specific aspect ratio such set forth above is a value measured by a measurement method described in the EXAMPLES section further below.

<Polyphenylene Ether>

The polyphenylene ether powder according to the present embodiment is a collection of polyphenylene ether particles.

Polyphenylene ether according to the present embodiment is preferably, but is not specifically limited to, a powder of a homopolymer and/or copolymer obtained though polymerization of a phenolic compound represented by the following formula (1).

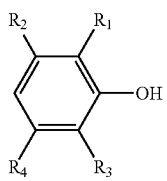
(1)

In formula (1), $R_1$, $R_2$, $R_3$, and $R_4$ are each, independently of one another, selected from the group consisting of a hydrogen atom, a halogen atom, an alkyl group having a carbon number of 1 to 7, a phenyl group, a haloalkyl group, an aminoalkyl group, an oxyhydrocarbon group, and an oxyhalohydrocarbon group in which a halogen atom and an oxygen atom are separated by at least two carbon atoms.

A halogen atom represented by any of $R_1$, $R_2$, $R_3$, and $R_4$ in formula (1) may, for example, be a fluorine atom, a chlorine atom, or a bromine atom, and is preferably a chlorine atom or a bromine atom.

An alkyl group represented by any of $R_1$, $R_2$, $R_3$, and $R_4$ in formula (1) is preferably a linear or branched alkyl group having a carbon number of 1 to 6, and more preferably having a carbon number of 1 to 3. The alkyl group may be, for example, a methyl, ethyl, propyl, isopropyl, butyl, isobutyl, sec-butyl, tert-butyl, pentyl, or hexyl, is preferably a methyl or ethyl, and is more preferably a methyl.

Moreover, an alkyl group represented by any of $R_1$, $R_2$, $R_3$, and $R_4$ in formula (1) may be substituted with one or more substituents at substitutable positions.

Examples of possible substituents include a halogen atom (for example, a fluorine atom, a chlorine atom, or a bromine atom), an alkyl group having a carbon number of 1 to 6 (for example, a methyl, ethyl, propyl, isopropyl, butyl, isobutyl, sec-butyl, tert-butyl, pentyl, or hexyl), an aryl group (for example, a phenyl or naphthyl), an alkenyl group (for example, an ethenyl, 1-propenyl, or 2-propenyl), an alkynyl group (for example, an ethynyl, 1-propynyl, or 2-propynyl), an aralkyl group (for example, a benzyl or phenethyl), and an alkoxy group (for example, a methoxy or ethoxy).

The reduced viscosity of the polyphenylene ether powder of the present embodiment (0.5 dL/g chloroform solution, measured at 30° C.) is preferably in a range of 0.3 dL/g to 1.0 dL/g, more preferably in a range of 0.32 dL/g to 0.80 dL/g, and even more preferably in a range of 0.35 dL/g to 0.60 dL/g from a viewpoint of obtaining excellent solubility, coatability, and mechanical characteristics.

The polyphenylene ether powder of the present embodiment may be a blend of two or more types of polyphenylene ether powders having different reduced viscosities. For example, the polyphenylene ether powder of the present embodiment may be a mixture of a polyphenylene ether powder having a reduced viscosity of no greater than 0.40 dL/g and a polyphenylene ether powder having a reduced viscosity of at least 0.45 dL/g. However, it is preferable that the reduced viscosity of this mixture is in a range of 0.30 dL/g to 0.55 dL/g.

The polyphenylene ether powder of the present embodiment has a loose bulk density of 0.35 g/cm³ to 0.70 g/cm³. The lower limit for the loose bulk density is more preferably at least 0.35 g/cm³, and even more preferably at least 0.40 g/cm³. The upper limit for the loose bulk density is more preferably no greater than 0.70 g/cm³, even more preferably no greater than 0.68 g/cm³, and particularly preferably no greater than 0.65 g/cm³.

Flushing is further suppressed when the loose bulk density of the polyphenylene ether powder is no greater 0.70 g/cm³. Moreover, excellent transport efficiency in transportation of the polyphenylene ether powder after packing in a container, and excellent weighability and handleability in handling of the polyphenylene ether powder can be achieved when the loose bulk density of the polyphenylene ether powder is at least 0.35 g/cm³.

The number average molecular weight (Mn) of the polyphenylene ether powder of the present embodiment is preferably 10,000 to 27,000, more preferably 13,000 to 25,000, and even more preferably 15,000 to 20,000. When the number average molecular weight (Mn) is in any of the ranges set forth above, the polyphenylene ether powder can be easily precipitated through mixing of a polyphenylene ether solution containing polyphenylene ether and a good solvent for polyphenylene ether with a poor solvent for polyphenylene ether. Moreover, pulverization can be suppressed, and excellent handleability can be achieved.

The number average molecular weight (Mn) is a value measured by a measurement method described in the EXAMPLES section further below.

The average particle diameter of the polyphenylene ether powder of the present embodiment is preferably 50 μm to 2,000 μm, more preferably 100 μm to 1,500 μm, and even more preferably 200 μm to 1,000 μm. Flushing and pulverization can be effectively suppressed when the average particle diameter of the polyphenylene ether powder is in any of the ranges set forth above.

The average particle diameter is a value measured by a measurement method described in the EXAMPLES section further below.

In an individual particle of the polyphenylene ether powder of the present embodiment, the volume of pores exceeding 6.5 μm in diameter is preferably 0% to 1.5% of the total volume, and more preferably 0% to 1.1% of the total volume. When the volume of pores exceeding 6.5 μm in diameter in individual polyphenylene ether particles is in either of the ranges set forth above, fracturing upon collision can be prevented, and pulverization can be suppressed.

The volume of pores exceeding 6.5 μm in diameter as a proportion relative to the total volume in an individual particle of polyphenylene ether is a value measured by a measurement method described in the EXAMPLES section further below.

The dispersibility of the polyphenylene ether powder of the present embodiment is preferably no greater than 40%, more preferably no greater than 30%, and even more preferably no greater than 20%. When the dispersibility is in any of the ranges set forth above, fine content is low, particle scattering is sufficiently suppressed, and handleability is excellent.

The dispersibility of the polyphenylene ether powder is a value measured by a measurement method described in the EXAMPLES section further below.

The angle of difference of the polyphenylene ether powder of the present embodiment is preferably less than 19°, and more preferably less than 17°. Excellent prevention of fracturing upon collision and further suppression of flushing can be achieved when the angle of difference is in either of the ranges set forth above.

The angle of difference of the polyphenylene ether powder is a value measured by a measurement method described in the EXAMPLES section further below.

The polyphenylene ether powder of the present embodiment preferably has a ratio of average particle diameter before formation of a slurry to average particle diameter after stirring as a slurry (average particle diameter before formation of slurry/average particle diameter after stirring as slurry) of 1.0 to 1.80, and more preferably 1.0 to 1.65. When the ratio of the average particle diameter before formation of a slurry to the average particle diameter after stirring as a slurry is in either of the ranges set forth above, excellent fracturing resistance can be achieved. In order words, fracturing upon collision can be prevented.

The average particle diameter after stirring as a slurry is a value measured by a measurement method described in the EXAMPLES section further below.

(Polymerization Step)

In a method for producing the polyphenylene ether powder of the present embodiment, a phenolic compound represented by formula (1) such as described below is first polymerized by solution polymerization to obtain a polymer solution containing polyphenylene ether (polymerization step).

Examples of phenolic compounds that can be used include o-cresol, 2,6-dimethylphenol, 2-ethylphenol, 2-methyl-6-ethylphenol, 2,6-diethylphenol, 2-n-propylphenol, 2-ethyl-6-n-propylphenol, 2-methyl-6-chlorophenol, 2-methyl-6-bromophenol, 2-methyl-6-isopropylphenol, 2-methyl-6-n-propylphenol, 2-ethyl-6-bromophenol, 2-methyl-6-n-butylphenol, 2,6-di-n-propylphenol, 2-ethyl-6-chlorophenol, 2-methyl-6-phenylphenol, 2-phenylphenol, 2,6-diphenylphenol, 2,6-bis(4-fluorophenyl)phenol, 2-methyl-6-tolylphenol, 2,6-ditolylphenol, 2,5-dimethylphenol, 2,3,6-trimethylphenol, 2,5-diethylphenol, 2-methyl-5-ethylphenol, 2-ethyl-5-methylphenol, 2-allyl-5-methylphenol, 2,5-diallylphenol, 2,3-diethyl-6-n-propylphenol, 2-methyl-5-chlorophenol, 2-methyl-5-bromophenol, 2-methyl-5-isopropylphenol, 2-methyl-5-n-propylphenol, 2-ethyl-5-bromophenol, 2-methyl-5-n-butylphenol, 2,5-di-n-propylphenol, 2-ethyl-5-chlorophenol, 2-methyl-5-phenylphenol, 2,5-diphenylphenol, 2,5-bis(4-fluorophenyl)phenol, 2-methyl-5-tolylphenol, 2,5-ditolylphenol, 2,6-dimethyl-3-allylphenol, 2,3,6-triallylphenol, 2,3,6-tributylphenol, 2,6-di-n-butyl-3-methylphenol, 2,6-di-t-butyl-3-methylphenol, 2,6-dimethyl-3-n-butylphenol, and 2,6-dimethyl-3-t-butylphenol.

Of these phenolic compounds, 2,6-dimethylphenol, 2,6-diethylphenol, 2,6-diphenylphenol, 2,3,6-trimethylphenol, and 2,5-dimethylphenol are preferable, and 2,6-dimethylphenol and 2,3,6-trimethylphenol are more preferable, particularly due to their low cost and ease of acquisition.

One phenolic compound may be used individually, or two or more phenolic compounds may be used in combination.

For example, a method in which a combination of 2,6-dimethylphenol and 2,6-diethylphenol is used, a method in which a combination of 2,6-dimethylphenol and 2,6-diphenylphenol is used, a method in which a combination of 2,3,6-trimethylphenol and 2,5-dimethylphenol is used, or a method in which a combination of 2,6-dimethylphenol and 2,3,6-trimethylphenol is used may be adopted. When a combination of phenolic compounds is used, the mixing ratio of these phenolic compounds may be freely selected. The phenolic compound that is used may contain a small amount of m-cresol, p-cresol, 2,4-dimethylphenol, 2,4,6-trimethylphenol, or the like as a side-product of production.

Besides the phenolic compound represented by formula (1), a dihydric phenolic compound represented by formula (2), shown below, may be included in the compound used in the present embodiment.

A dihydric phenolic compound such as represented by formula (2) can be produced in an industrially advantageous manner through reaction of a corresponding monohydric phenolic compound and an aldehyde (for example, formaldehyde), a ketone (for example, acetone, methyl ethyl ketone, methyl isobutyl ketone, acetophenone, or cyclohexanone), or a dihalogenated aliphatic hydrocarbon, or through reaction of corresponding monohydric phenolic compounds with one another.

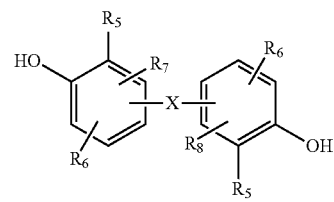

(2)

In formula (2), $R_5$, $R_6$, $R_7$, and $R_8$ are each, independently of one another, selected from the group consisting of a hydrogen atom, a halogen atom, an alkyl group having a carbon number of 1 to 7, a phenyl group, a haloalkyl group, an aminoalkyl group, an oxyhydrocarbon group, and an oxyhalohydrocarbon group in which a halogen atom and an oxygen atom are separated by at least two carbon atoms.

X in formula (2) is selected from the group consisting of a single bond, a divalent heteroatom, and a divalent hydrocarbon group having a carbon number of 1 to 12.

More specifically, examples of dihydric phenolic compounds represented by formula (2) include compounds represented by the following general formulae (2-a), (2-b), and (2-c).

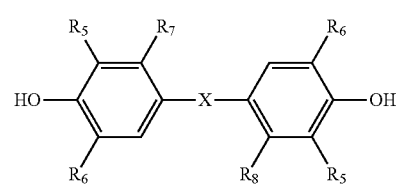

(2-a)

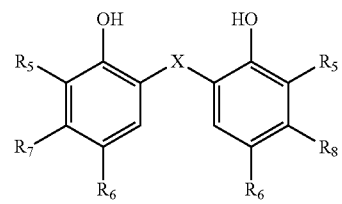

(2-b)

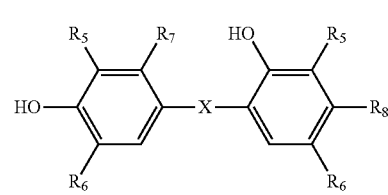

(2-c)

In formulae (2-a), (2-b), and (2-c), $R_5$, $R_6$, $R_7$, and $R_8$ are each, independently of one another, selected from the group consisting of a hydrogen atom, a halogen atom, an alkyl group having a carbon number of 1 to 7, a phenyl group, a haloalkyl group, an aminoalkyl group, an oxyhydrocarbon group, and an oxyhalohydrocarbon group in which a halogen atom and an oxygen atom are separated by at least two carbon atoms.

X in formulae (2-a), (2-b), and (2-c) is selected from the group consisting of a single bond, a divalent heteroatom, and a divalent hydrocarbon group having a carbon number of 1 to 12.

Representative examples of compounds represented by formulae (2-a), (2-b), and (2-c) include, but are not limited to, a compound for which $R_5$ and $R_6$ are methyl groups, $R_7$ and $R_8$ are hydrogen, and X directly links the aryl groups; a compound for which $R_5$ and $R_6$ are methyl groups, $R_7$ and $R_8$ are hydrogen, and X is methylene; a compound for which $R_5$ and $R_6$ are methyl groups, $R_7$ and $R_8$ are hydrogen, and X is a thioether; a compound for which $R_5$, $R_6$, and $R_7$ are methyl groups, $R_8$ is hydrogen, and X is ethylene; a compound for which $R_5$ and $R_6$ are methyl groups, $R_7$ and $R_8$ are hydrogen, and X is isopropylidene; a compound for which $R_5$ and $R_6$ are methyl groups, $R_7$ and $R_8$ are hydrogen, and X is cyclohexylidene; a compound for which $R_5$, $R_6$, and $R_7$ are methyl groups, $R_8$ is hydrogen, and X directly links the aryl groups; a compound for which $R_5$, $R_6$, and $R_7$ are methyl groups, $R_8$ is hydrogen, and X is methylene; a compound for which $R_5$, $R_6$, and $R_7$ are methyl groups, $R_8$ is hydrogen, and X is ethylene; a compound for which $R_5$, $R_6$, and $R_7$ are methyl groups, $R_8$ is hydrogen, and X is a thioether; a compound for which $R_5$, $R_6$, and $R_7$ are methyl groups, $R_8$ is hydrogen, and X is isopropylidene; a compound for which $R_5$, $R_6$, $R_7$, and $R_8$ are methyl groups, and X is methylene; a compound for which $R_5$, $R_6$, $R_7$, and $R_8$ are methyl groups, and X is ethylene; and a compound for which $R_5$, $R_6$, $R_7$, and $R_8$ are methyl groups, and X is isopropylidene.

Furthermore, a polyhydric phenolic compound may also be present besides the phenolic compound represented by formula (1) in the present embodiment.

The polyhydric phenolic compound is, for example, a compound having at least 3 and fewer than 9 phenolic hydroxy groups in molecules thereof, and having an alkyl group or alkylene group at the 2- and 6-positions relative to at least one of the phenolic hydroxy groups.

Examples of the polyhydric phenolic compound include, but are not limited to, 4,4'-[(3-hydroxyphenyl)methylene]bis(2,6-dimethylphenol), 4,4'-[(3-hydroxyphenyl)methylene]bis(2,3,6-trimethylphenol), 4,4'-[(4-hydroxyphenyl)methylene]bis(2,6-dimethylphenol), 4,4'-[(4-hydroxyphenyl)methylene]bis(2,3,6-trimethylphenol), 4,4'-[(2-hydroxy-3-methoxyphenyl)methylene]bis(2,6-dimethylphenol), 4,4'-[(4-hydroxy-3-ethoxyphenyl)methylene]bis(2,3,6-trimethylethylphenol), 4,4'-[(3,4-dihydroxyphenyl)methylene]bis(2,6-dimethylphenol), 4,4'-[(3,4-dihydroxyphenyl)methylene]bis(2,3,6-trimethylphenol), 2,2'-[(4-hydroxyphenyl)methylene]bis(3,5,6-trimethylphenol), 4,4'-[4-(4-hydroxyphenyl)cyclohexylidene]bis(2,6-dimethylphenol), 4,4'-[(2-hydroxyphenyl)methylene]-bis(2,3,6-trimethylphenol), 4,4'-[1-[4-[1-(4-hydroxy-3,5-dimethylphenyl)-1-methylethyl]phenyl]ethylidene]bis(2,6-dimethylphenol), 4,4'-[1-[4-[1-(4-hydroxy-3-fluorophenyl)-1-methylethyl]phenyl]ethylidene]bis(2,6-dimethylphenol), 2,6-bis[(4-hydroxy-3,5-dimethylphenyl)ethyl]-4-methylphenol, 2,6-bis[(4-hydroxy-2,3,6-trimethylphenyl)methyl]-4-methylphenol, 2,6-bis[(4-hydroxy-3,5,6-trimethylphenyl)methyl]-4-ethylphenol, 2,4-bis[(4-hydroxy-3-methylphenyl)methyl]-6-methylphenol, 2,6-bis[(4-hydroxy-3-methylphenyl)methyl]-4-methylphenol, 2,4-bis[(4-hydroxy-3-cyclohexylphenyl)methyl]-6-methylphenol, 2,4-bis[(4-hydroxy-3-methylphenyl)methyl]-6-cyclohexylphenol, 2,4-bis[(2-hydroxy-5-methylphenyl)methyl]-6-cyclohexylphenol, 2,4-bis[(4-hydroxy-2,3,6-trimethylphenyl)methyl]-6-cyclohexylphenol, 3,6-bis[(4-hydroxy-3,5-dimethylphenyl)methyl]-1,2-benzenediol, 4,6-bis[(4-hydroxy-3,5-dimethylphenyl)methyl]-1,3-benzenediol, 2,4,6-tris[(4-hydroxy-3,5-dimethylphenyl)methyl]-1,3-benzenediol, 2,4,6-tris[(2-hydroxy-3,5-dimethylphenyl)methyl]-1,3-benzenediol, 2,2'-methylene bis[6-[(4/2-hydroxy-2,5/3,6-dimethylphenyl)methyl]-4-methylphenol], 2,2'-methylene bis[6-[(4-hydroxy-3,5-dimethylphenyl)methyl]-4-methylphenol], 2,2'-methylene bis[6-[(4/2-hydroxy-2,3,5/3,4,6-trimethylphenyl)methyl]-4-methylphenol], 2,2'-methylene bis[6-[(4-hydroxy-2,3,5-trimethylphenyl)methyl]-4-methylphenol], 4,4'-methylene bis[2-[(2,4-dihydroxyphenyl)methyl]-6-methylphenol], 4,4'-methylene bis[2-[(2,4-dihydroxyphenyl)methyl]-3,6-dimethylphenol], 4,4'-methylene bis[2-[(2,4-dihydroxy-3-methylphenyl)methyl]-3,6-dimethylphenol], 4,4'-methylene bis[2-[(2,3,4-trihydroxyphenyl)methyl]-3,6-dimethylphenol], 6,6'-methylene bis[4-[(4-hydroxy-3,5-dimethylphenyl)methyl]-1,2,3-benzenetriol], 4,4'-cyclohexylidene bis[2-cyclohexyl-6-[(2-hydroxy-5-methylphenyl)methyl]phenol], 4,4'-cyclohexylidene bis[2-cyclohexyl-6-[(4-hydroxy-3,5-dimethylphenyl)methyl]phenol], 4,4'-cyclohexylidene bis[2-cyclohexyl-6-[(4-hydroxy-2-methyl-5-cyclohexylphenyl)methyl]phenol], 4,4'-cyclohexylidene bis[2-cyclohexyl-6-[(2,3,4-trihydroxyphenyl)methyl]phenol], 4,4',4'',4'''-(1,2-ethanediylidene)tetrakis(2,6-dimethylphenol), and 4,4',4'',4'''-(1,4-phenylenedimethylidene)tetrakis(2,6-dimethylphenol).

Although the number of phenolic hydroxy groups in the polyhydric phenolic compound is not specifically limited so long as there are at least 3 phenolic hydroxy groups, a larger number of phenolic hydroxy groups may result in a large change in molecular weight upon heating. Therefore, the number of phenolic hydroxy groups is preferably 3 to 6, and more preferably 3 or 4.

Moreover, it is preferable that the alkyl group or alkylene group at the 2- and 6-positions in the polyhydric phenolic compound is a methyl group.

The most preferred polyhydric phenolic compounds are
4,4'-[(4-hydroxyphenyl)methylene]bis(2,6-dimethylphenol),
4,4'-[(3-hydroxyphenyl)methylene]bis(2,6-dimethylphenol),
4,4'-[(4-hydroxyphenyl)methylene]bis(2,3,6-trimethylphenol),
4,4'-[(3-hydroxyphenyl)methylene]bis(2,3,6-trimethylphenol), and
4,4',4'',4'''-(1,4-phenylenedimethylidene)tetrakis(2,6-dimethylphenol).

As explained further below, the polymer solution obtained through the polymerization step may be heated to the boiling point of the good solvent or higher to adjust the polymer concentration and obtain a concentrated polymer solution (concentration step). The concentration step is carried out as necessary. Next, the polymer solution is mixed with a poor solvent for polyphenylene ether to precipitate polyphenylene ether and produce a slurry (precipitation step).

In the solution polymerization performed in the present embodiment, polymerization is carried out in a good solvent for polyphenylene ether and is, therefore, a polymerization method in which a precipitate of polyphenylene ether is not formed during polymerization.

Polyphenylene ether molecules produced through the solution polymerization are completely dissolved, which tends to lead to a broader molecular weight distribution. Particulate polyphenylene ether is obtained as a result of the polymer solution in which polyphenylene ether is dissolved being subjected to the concentration step as necessary and subsequently being mixed with a poor solvent for polyphenylene ether in the precipitation step.

The good solvent for polyphenylene ether used in the polymerization step is preferably at least one selected from the group consisting of benzene, toluene, and xylene from a viewpoint of polyphenylene ether solubility, but is not limited to these examples.

The polymerization method by which polyphenylene ether is produced may, for example, be a method described in U.S. Pat. No. 3,306,874 A in which oxidative polymerization of 2,6-xylenol is carried out using a complex of a cuprous salt and an amine as a catalyst, but is not limited to this method.

Methods described in U.S. Pat. Nos. 3,306,875 A, 3,257,357 A, 3,257,358 A, JP S52-17880 B, JP S50-51197 A, and JP S63-152628 A can also be preferably used as a method for producing polyphenylene ether.

The monomer concentration in the polymerization step, based on the total amount of the polymerization solution, is preferably 10 mass % to 30 mass %, and more preferably 13 mass % to 27 mass % from a viewpoint of efficiently producing polyphenylene ether and from a viewpoint of producing polyphenylene ether having a molecular weight distribution in a suitable range such as set forth above. A concentration of at least 10 mass % increases polyphenylene ether production efficiency. However, a concentration exceeding 30 mass % makes it difficult to adjust the number average molecular weight to a suitable range such as set forth above. The reason for this is presumed to be as follows. Specifically, a monomer concentration exceeding 30 mass % increases the liquid viscosity at the end of polymerization and makes it difficult to perform uniform stirring. This may cause non-uniform reaction, leading to production of polyphenylene ether having an unexpected molecular weight.

The polyphenylene ether polymerization step is preferably carried out while supplying an oxygen-containing gas.

Examples of oxygen-containing gases that may be used include pure oxygen, a mixture of oxygen and an inert gas such as nitrogen in any ratio, air, and a mixture of air and an inert gas such as nitrogen or a noble gas in any ratio.

The internal pressure of the reaction system in the polymerization step may be normal pressure. Alternatively, the polymerization step may be carried out under reduced pressure or increased pressure as necessary. The supply rate of the oxygen-containing gas can be freely selected in consideration of heat removal, the rate of polymerization, and so forth. However, the supply rate of pure oxygen per mole of the phenolic compound used in polymerization is preferably at least 5 NmL/min, and more preferably at least 10 NmL/min.

An alkali metal hydroxide, an alkaline earth metal hydroxide, an alkali metal alkoxide, a neutral salt such as magnesium sulfate or calcium chloride, or a zeolite may be added to the reaction system in the polyphenylene ether polymerization step to improve the rate of reaction.

Moreover, a surfactant that is conventionally known to have an effect of improving polymerization activity may be added in a polymerization solvent. The surfactant may, for example, be trioctylmethylammonium chloride known by the product names Aliquat 336 and CapRiquat (produced by Dojindo Laboratories). The amount of the surfactant that is used preferably does not exceed 0.1 mass % relative to the total amount of polymerization reaction raw materials from a viewpoint of molecular weight control.

A commonly known catalyst that is typically used in production of polyphenylene ether may be added to the reaction system in the polyphenylene ether polymerization step.

The catalyst may be, but is not limited to, a catalyst including a transition metal ion having oxidation-reduction capability and an amine compound capable of complexation with the metal ion. Specific examples include a catalyst including a copper compound and an amine, a catalyst including a manganese compound and an amine, and a catalyst including a cobalt compound and an amine.

A small amount of an alkali or amine is preferably added in the polyphenylene ether polymerization step because the polymerization reaction proceeds efficiently under slightly alkaline conditions.

One example of a more suitable catalyst that may be used in the polymerization step is a catalyst including a diamine compound represented by the following formula (3), a copper compound, and a halogen compound as components thereof.

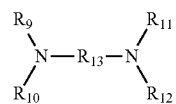

(3)

In formula (3), $R_9$, $R_{10}$, $R_{11}$, and $R_{12}$ are each, independently of one another, selected from the group consisting of a hydrogen atom and a linear or branched alkyl group having a carbon number of 1 to 6. However, $R_9$, $R_{10}$, $R_{11}$, and $R_{12}$ are not all hydrogen.

$R_{13}$ is a linear or branched alkylene group having a carbon number of 2 to 5.

Examples of diamine compounds represented by formula (3) include, but are not limited to, N,N,N',N'-tetramethylethylenediamine, N,N,N'-trimethylethylenediamine, N,N'-dimethylethylenediamine, N,N-dimethylethylenediamine, N-methylethylenediamine, N,N,N',N'-tetraethylethylenediamine, N,N,N'-triethylethylenediamine, N,N'-diethylethylenediamine, N,N-diethylethylenediamine, N-ethylethylenediamine, N,N-dimethyl-N'-ethylethylenediamine, N,N'-dimethyl-N-ethylethylenediamine, N-n-propylethylenediamine, N,N'-di-n-propylethylenediamine, N-i-propylethylenediamine, N,N'-di-i-propylethylenediamine, N-n-butylethylenediamine, N,N'-di-n-butylethylenediamine, N-i-butylethylenediamine, N,N'-di-i-butylethylenediamine, N-t-butylethylenediamine, N,N'-di-t-butylethylenediamine, N,N,N',N'-tetramethyl-1,3-diaminopropane, N,N,N'-trimethyl-1,3-diaminopropane, N,N'-dimethyl-1,3-diaminopropane, N-methyl-1,3-diaminopropane, N,N,N',N'-tetramethyl-1,3-diamino-1-methylpropane, N,N,N',N'-tetramethyl-1,3-diamino-2-methylpropane, N,N,N',N'-tetramethyl-1,4-diaminobutane, and N,N,N',N'-tetramethyl-1,5-diaminopentane.

A diamine compound in which the alkylene group ($R_{13}$) connecting the two nitrogen atoms in formula (3) has a carbon number of 2 or 3 is preferable in terms of complexation capability with a metal catalyst.

Although the amount of such diamine compounds that is used is not specifically limited, the amount is normally in a range of 0.01 moles to 10 moles per 100 moles of the phenolic compound used in the polymerization step.

Examples of copper compounds that may be used as a component of the catalyst include cuprous compounds, cupric compounds, and mixtures thereof.

Examples of cuprous compounds that can be used include, but are not limited to, cuprous chloride, cuprous bromide, cuprous sulfate, and cuprous nitrate.

Examples of cupric compounds that can be used include cupric chloride, cupric bromide, cupric sulfate, and cupric nitrate.

Of these copper compounds, cuprous chloride, cupric chloride, cuprous bromide, and cupric bromide are particularly preferable in terms of polymerization reaction activity.

These copper compounds may be synthesized from an oxide (for example, cuprous oxide), carbonate, hydroxide, or the like and a corresponding halogen or acid. For example, cuprous chloride can be synthesized by mixing cuprous oxide and a halogen compound (for example, a hydrogen halide solution).

One of such copper compounds may be used individually, or two or more of such copper compounds may be used in combination.

Examples of halogen compounds that may be used as a component of the catalyst include, but are not limited to, hydrogen chloride, hydrogen bromide, hydrogen iodide, sodium chloride, sodium bromide, sodium iodide, potassium chloride, potassium bromide, potassium iodide, tetramethylammonium chloride, tetramethylammonium bromide, tetramethylammonium iodide, tetraethylammonium chloride, tetraethylammonium bromide, and tetraethylammonium iodide. These halogen compounds may be used in the form of an aqueous solution or a solution with an appropriate solvent.

Of such halogen compounds, an aqueous solution of hydrogen chloride or an aqueous solution of hydrogen bromide is preferable in terms of polymerization reaction activity.

One of such halogen compounds may be used individually, or two or more of such halogen compounds may be used in combination.

Although no specific limitations are placed on the amounts of copper compounds and halogen compounds that can be used as components of the catalyst, in a situation in which both a copper compound and a halogen compound are used as components of the catalyst, it is preferable that the number of moles of halogen atoms is 2 to 20 times the number of moles of copper atoms.

Moreover, although the amount of copper atoms is not specifically limited, it is preferable that the amount is in a range of 0.02 moles to 0.6 moles per 100 moles of the phenolic compound that is used.

Besides the compounds described above, the catalyst used in the polymerization step may contain, for example, a tertiary monoamine compound and a secondary monoamine compound, either individually or in combination.

Aliphatic tertiary amines, inclusive of alicyclic tertiary amines, can be used as the tertiary monoamine compound.

Examples of tertiary monoamine compounds that can be used include, but are not limited to, trimethylamine, triethylamine, tripropylamine, tributylamine, triisobutylamine, dimethylethylamine, dimethylpropylamine, allyldiethylamine, dimethyl-n-butylamine, diethylisopropylamine, and N-methylcyclohexylamine.

One of such tertiary monoamine compounds may be used individually, or two or more of such tertiary monoamine compounds may be used in combination.

Although no specific limitations are placed on the amount of the tertiary monoamine compound that is used, it is preferable that the amount is no greater than 15 moles per 100 moles of the phenolic compound used in the polymerization step.

It is not normally necessary to add the entire amount of the tertiary monoamine compound to the reaction system at the start of the polymerization step. In other words, a portion of the tertiary monoamine compound may be added partway through polymerization, or a portion of the tertiary monoamine compound may be added sequentially from the start of polymerization. Moreover, the tertiary monoamine compound may be added to the phenolic compound or a solution of the phenolic compound and then be added in accompaniment thereto at the same time as polymerization is initiated.

Examples of the secondary monoamine compound include secondary aliphatic amines.

Examples of secondary aliphatic amines that can be used include, but are not limited to, dimethylamine, diethylamine, di-n-propylamine, di-i-propylamine, di-n-butylamine, di-i-butylamine, di-t-butylamine, dipentylamines, dihexylamines, dioctylamines, didecylamines, dibenzylamines, methylethylamine, methylpropylamine, methylbutylamine, and cyclohexylamine.

Aromatic-containing secondary monoamine compounds can also be used as the secondary monoamine compound.

Examples of aromatic-containing secondary monoamine compounds that can be used include, but are not limited to, N-phenylmethanolamine, N-phenylethanolamine, N-phenylpropanolamine, N-(m-methylphenyl)ethanolamine, N-(p-methylphenyl)ethanolamine, N-(2',6'-dimethylphenyl)ethanolamine, N-(p-chlorophenyl)ethanolamine, N-ethylaniline, N-butylaniline, N-methyl-2-methylaniline, N-methyl-2,6-dimethylaniline, and diphenylamine.

One of such secondary monoamine compounds may be used individually, or two or more of such secondary monoamine compounds may be used in combination.

Although no specific limitations are placed on the amount of the secondary monoamine compound that is used, it is preferable that the amount is no greater than 15 moles per 100 moles of the phenolic compound used in the polymerization step.

It is not normally necessary to add the entire amount of the secondary monoamine compound to the reaction system at the start of the polymerization step. In other words, a portion of the secondary monoamine compound may be added partway through polymerization, or a portion of the secondary monoamine compound may be added sequentially from the start of polymerization. Moreover, the secondary monoamine compound may be added to the phenolic compound or a solution of the phenolic compound and then be added in accompaniment thereto at the same time as polymerization is initiated.

The polyphenylene ether obtained after the polymerization step described above may be subjected to an after-treatment step.

Although the actual method of the after-treatment step is not specifically limited, normally a method is adopted in which the catalyst is deactivated through addition of an acid such as hydrochloric acid or acetic acid; ethylenediaminetetraacetic acid (EDTA) or a salt thereof; nitrilotriacetic acid or a salt thereof; or the like to the reaction liquid.

Moreover, since the polymerization solution obtained at the end of polymerization has polyphenylene ether in a dissolved state in a good solvent, an objective of washing out the catalyst can be suitably achieved through a method in which washing treatment is repeatedly performed using a solution composed mainly of a solvent (for example, water)

that has low polyphenylene ether-dissolving ability and that phase separates with the good solvent for polyphenylene ether.

(Concentration Step)

In the method for producing the polyphenylene ether powder of the present embodiment, the polyphenylene ether solution obtained through the polymerization step that contains polyphenylene ether and a good solvent for polyphenylene ether may be heated to the boiling point of the good solvent or higher to remove the good solvent from the system and concentrate the polyphenylene ether solution as necessary (concentration step).

The content of PPE (polyphenylene ether) in the solution after concentration is preferably 15 mass % to 50 mass %, more preferably 20 mass % to 48 mass %, and even more preferably 30 mass % to 46 mass %.

(Precipitation Step)

In the method for producing the polyphenylene ether powder of the present embodiment, the good solvent solution of polyphenylene ether that has been obtained through the polymerization step, and that has been subjected to the concentration step as necessary, is mixed with a poor solvent (for example, a hydrocarbon solvent) to precipitate polyphenylene ether (precipitation step).

The precipitation step is carried out by, for example, adding the polymer solution obtained through the polymerization step or the concentration step set forth above and a poor solvent including a poor solvent having a solubility parameter value of less than 9 $(cal/cm^3)^{1/2}$ (18.41 $(J/cm^3)^{1/2}$) to a precipitation tank pre-charged with an initially charged liquid containing a poor solvent, and then stirring the contents of the precipitation tank. This causes precipitation of polyphenylene ether and production of a slurry.

From a viewpoint of stable operation, it is preferable that a poor solvent and a good solvent are charged to the precipitation tank as the initially charged liquid in a mass ratio (initially charged poor solvent/initially charged good solvent) of 0.4 to 3.0, more preferably 0.6 to 2.8, and even more preferably 1.0 to 2.5.

The poor solvent contained in the initially charged liquid may be, but is not limited to, any of the poor solvents listed further below as examples of the poor solvent having a solubility parameter value of less than 9 $(cal/cm^3)^{1/2}$ (18.41 $(J/cm^3)^{1/2}$) that is included in the subsequently added poor solvent. The poor solvent contained in the initially charged liquid may be the same poor solvent as added to the precipitation tank as the solvent having a solubility parameter value of less than 9 $(cal/cm^3)^{1/2}$ (18.41 $(J/cm^3)^{1/2}$), or may be a different poor solvent. One of such poor solvents may be used individually, or two or more of such poor solvents may be used in combination.

The good solvent contained in the initially charged liquid may be, but is not limited to, any of the good solvents listed above as examples of the good solvent used in the polymerization step. The good solvent contained in the initially charged liquid may be the same good solvent as used in the polymerization step and contained in the polyphenylene ether solution (also referred to as the "polymer solution"), or may be a different good solvent. One of such good solvents may be used individually, or two or more of such good solvents may be used in combination.

The content of PPE in the entire solution in the precipitation tank (inclusive of polyphenylene ether, good solvent, and poor solvent) is preferably 5 mass % to 30 mass %, more preferably 7 mass % to 28 mass %, and even more preferably 9 mass % to 25 mass %.

The poor solvent used in the precipitation step of the method for producing the polyphenylene ether powder of the present embodiment includes a poor solvent having a solubility parameter value of less than 9 $(cal/cm^3)^{1/2}$ (18.41 $(J/cm^3)^{1/2}$).

The solubility parameter value referred to in this disclosure is the Hildebrand solubility parameter and may also be referred to as an SP value. The solubility parameter value is a value defined by the following equation (1) and is used as an index of the solubility of substances (refer to Polymer Handbook, Third Edition, John Wiley & Sons, 1989).

$$\delta = \{(\Delta H - RT)/V\}^{1/2} \quad (1)$$

In equation (1):

$\delta$ is the solubility parameter value $(cal/cm^3)^{1/2}$ [note that since 1 cal is equivalent to 4.18605 J, 1 $(cal/cm^3)^{1/2}$ is taken to be 2.046 $(J/cm^3)^{1/2}$];

$\Delta H$ is the molar heat of vaporization (cal/mol);

R is the ideal gas constant (cal/K·mol);

T is the absolute temperature (K); and

V is the molar volume ($cm^3$/mol).

Examples of poor solvents having a solubility parameter value of less than 9 $(cal/cm^3)^{1/2}$ (i.e., 18.41 $(J/cm^3)^{1/2}$) that can be used include, but are not limited to, hydrocarbon solvents such as n-hexane (SP value: 7.3 $(cal/cm^3)^{1/2}$ [i.e., 14.94 $(J/cm^3)^{1/2}$]) and n-heptane (SP value: 7.4 $(cal/cm^3)^{1/2}$ [i.e., 15.14 $(J/cm^3)^{1/2}$]), and ether solvents such as diethyl ether (SP value: 7.4 $(cal/cm^3)^{1/2}$ [i.e., 15.14 $(J/cm^3)^{1/2}$]), dibutyl ether (SP value: 7.8 $(cal/cm^3)^{1/2}$ [i.e., 15.96 $(J/cm^3)^{1/2}$]), and ethylene glycol diethyl ether (SP value: 8.3 $(cal/cm^3)^{1/2}$ [i.e., 16.98 $(J/cm^3)^{1/2}$]). One of such poor solvents may be used individually, or two or more of such poor solvents may be used in combination.

The poor solvent having a solubility parameter value of less than 9 $(cal/cm^3)^{1/2}$ (i.e., 18.41 $(J/cm^3)^{1/2}$) that is used in the precipitation step is preferably a hydrocarbon solvent from a viewpoint of uniformity and enlargement of particle diameters of polyphenylene ether particles. The poor solvent having a solubility parameter value of less than 9 $(cal/cm^3)^{1/2}$ (i.e., 18.41 $(J/cm^3)^{1/2}$) may be the same poor solvent as contained in the initially charged liquid, or may be a different poor solvent.

The mass ratio of the poor solvent having a solubility parameter value of less than 9 $(cal/cm^3)^{1/2}$ (18.41 $(J/cm^3)^{1/2}$) included in the poor solvent added to the precipitation tank relative to the good solvent contained in the polymer solution added to the precipitation tank (added poor solvent having solubility parameter value of less than 9 $(cal/cm^3)^{1/2}$ (18.41 $(J/cm^3)^{1/2}$)/good solvent in added polymer solution) is preferably in a range of 0.9 to 4.0, more preferably in a range of 1.0 to 3.5, and even more preferably in a range of 1.2 to 3.2. The term "added" indicates that solvents contained in the initially charged liquid are not included.

When this mass ratio is in any of the ranges set forth above, the fluid state of the mixed liquid in the precipitation tank is extremely stable, which enables polyphenylene ether particles to be obtained having a particle diameter distribution exhibiting very little irregularity. The stable fluid state also results in minimal scale (scaling) in the precipitation tank and enables stable operation. If the mass ratio of the added poor solvent having a solubility parameter value of less than 9 $(cal/cm^3)^{1/2}$ (18.41 $(J/cm^3)^{1/2}$) and the good solvent in the added polymer solution is less than 0.9, precipitation of particles is insufficient, leading to a reduction in the amount of polymer that is recovered. Moreover, the content of polyphenylene ether particles having an aspect ratio of 2.0 to 7.0 is reduced. On the other hand, depending on the concentration of the good solvent solution of polyphenylene ether, aggregation of polyphenylene ether particles may not occur efficiently if this mass ratio exceeds 4.0.

A poor solvent having a solubility parameter value of at least 9 $(cal/cm^3)^{1/2}$ (i.e., 18.41 $(J/cm^3)^{1/2}$) may be added in particle precipitation to control the particle diameter. For example, one or more selected from alcohol solvents such as methanol (SP value: 14.5 $(cal/cm^3)^{1/2}$ [i.e., 29.67 $(J/cm^3)^{1/2}$]), ethanol (SP value: 12.7 $(cal/cm^3)^{1/2}$ [i.e., 25.98 $(J/cm^3)^{1/2}$]), and isopropanol (SP value: 11.5 $(cal/cm^3)^{1/2}$ [i.e., 23.53 $(J/cm^3)^{1/2}$]), ketone solvents such as acetone (SP value: 9.9 $(cal/cm^3)^{1/2}$ [i.e., 20.26 $(J/cm^3)^{1/2}$]) and methyl ethyl ketone (SP value: 9.3 $(cal/cm^3)^{1/2}$ [i.e., 19.03 $(J/cm^3)^{1/2}$]), and water may be added. The content of the poor solvent having a solubility parameter value of at least 9 $(cal/cm^3)^{1/2}$ (18.41 $(J/cm^3)^{1/2}$) among all solvents in the precipitation tank (i.e., when the total of good solvents and poor solvents in taken to be 100 mass %) is preferably 0.5 mass % to 20 mass %, and more preferably 1 mass % to 10 mass % from a viewpoint of enlargement and control of precipitated particle shape.

One of such poor solvents may be used individually, or two or more of such poor solvents may be used in combination.

The temperature of the mixture of the polyphenylene ether solution and the poor solvent in the precipitation tank is in a range of −80° C. to 30° C. A temperature in the range set forth above enables precipitation of elongated polyphenylene ether particles having an aspect ratio of 2.0 to 7.0. The temperature of the mixture of the polyphenylene ether solution and the poor solvent in the precipitation tank is preferably in a range of −40° C. to 25° C., and more preferably in a range of −10° C. to 20° C. from a viewpoint of control of precipitated particle shape.

The temperature of the mixture can be controlled to within a desired range through adjustment of the temperature setting of a jacket of the precipitation tank.

The residence time of polyphenylene ether in the precipitation tank is preferably 0.25 minutes to 5 minutes in order to achieve a balance of allowing growth of precipitated particles while inhibiting scaling caused by residence of precipitated particles at the bottom of the precipitation tank, and also from a viewpoint of maintaining stability of precipitated particle diameter. The residence time is more preferably 0.5 minutes to 3 minutes.

The precipitation tank preferably includes an impeller having at least one stage selected from an inclined paddle blade, a screw blade, and a ribbon blade.

It is preferable that this impeller is used to perform stirring during the precipitation step described above. The impeller is preferably a downward pumping impeller. The precipitation tank preferably includes at least one baffle from a viewpoint of flow stabilization.

The tip speed of the impeller during stirring is preferably 1.7 m/s to 7.0 m/s, and more preferably 2.0 m/s to 5.5 m/s.

The tip speed (m/s) can be determined by the following equation.

Tip speed (m/s)={π×(impeller diameter (m))×(rotational speed (rpm))}/60

Stirring through rotation of the impeller at a tip speed in either of the ranges set forth above enables precipitation of polyphenylene ether as elongated particles having an aspect ratio of 2.0 to 7.0.

The precipitation tank preferably includes a draft tube from a viewpoint of flow stability and particle diameter control. In a situation in which a draft tube is included, it is preferable from a viewpoint of creating strong flow in the center of the precipitation tank that an impeller having at least one stage selected from an inclined paddle blade, a screw blade, and a ribbon blade is provided inside the draft tube. Moreover, the impeller provided inside the draft tube is preferably a downward pumping impeller. It is preferable that this downward pumping impeller is used to perform stirring during the precipitation step described above. This enables circulation through downward flow inside the draft tube and upward flow outside the draft tube, which has an effect of stabilizing the stirring operation state.

To create strong flow outside of the draft tube, it is preferable that the precipitation tank used in the precipitation step includes a ribbon blade-type impeller outside of the draft tube. From a viewpoint of causing circulation by accelerating downward flow inside the draft tube, it is preferable that the ribbon blade-type impeller located outside of the draft tube is an upward pumping impeller, and it is preferable that the upward pumping impeller is used to perform stirring in the precipitation step described above.

Polyphenylene ether obtained at a stage after the precipitation step contains one or more elongated polyphenylene ether particles having an aspect ratio (DL/DS), expressing a ratio of a major axis diameter (DL) and a minor axis diameter (DS) of an individual particle, of 2.0 to 7.0.

(Washing Step)

In the method for producing the polyphenylene ether powder of the present embodiment, the precipitated polyphenylene ether may be washed with a poor solvent (washing step).

The washing step may be carried out by, for example, solid-liquid separating the slurry obtained through the precipitation step to separate solvent and wet polyphenylene ether, washing the wet polyphenylene ether with a poor solvent while performing solid-liquid separation thereof, and subsequently drying the wet polyphenylene ether.

To improve washability as necessary, a poor solvent may be added to the slurry obtained through the precipitation step to dilute the slurry, and the slurry may then be stirred before being subjected to solid-liquid separation.

The poor solvent used in the washing step of the method for producing the polyphenylene ether powder of the present embodiment may be the same as used in the previously described precipitation step. Specifically, a hydrocarbon solvent such as n-hexane or n-heptane or an ether solvent such as diethyl ether, dibutyl ether, or ethylene glycol diethyl ether is preferable, and a poor solvent having low latent heat of vaporization such as n-hexane or diethyl ether is more preferable.

The mass ratio (b/a) of the poor solvent (b) used in the washing step and polyphenylene ether (a) subjected to washing after the precipitation step is preferably in a range of 1.0 to 5.0, more preferably in a range of 1.5 to 4.0, and even more preferably in a range of 2.0 to 3.0.

In a situation in which the poor solvent used in the washing step has low latent heat of vaporization, the poor solvent component can be quickly volatilized in a dryer. As a result, time spent in the dryer in the subsequently described drying step can be used for volatilizing a good solvent having a higher boiling point (for example, an aromatic hydrocarbon solvent), which improves the efficiency of the drying step.

Examples of devices that can be used for solid-liquid separation in the washing step include, but are not limited to, a centrifugal separator (for example, a vibrating, screw, decanter, or basket-type centrifugal separator), a vacuum filter (for example, a drum filter, belt filter, rotary vacuum filter, Young filter, or Nutsche filter), a filter press, and a roll press.

(Drying Step)

Next, polyphenylene ether obtained after washing in the method for producing the polyphenylene ether powder of the present embodiment is dried (drying step).

The drying can be carried out at a high temperature of a level that does not cause fusing of the wet polyphenylene ether.

The temperature at which the drying step is carried out is preferably at least 60° C., more preferably at least 80° C., even more preferably at least 120° C., further preferably at least 140° C., even further preferably at least 150° C., and most preferably at least 160° C. Drying of the wet polyphenylene ether at a temperature of at least 60° C. can efficiently reduce the content of an aromatic hydrocarbon good solvent in the polyphenylene ether powder.

The wet polyphenylene ether subjected to the drying is preferably wet polyphenylene ether in which the content of a good solvent, such as an aromatic hydrocarbon solvent, has been reduced as much as possible through the washing step. By reducing the good solvent content as much as possible, it is possible to suppress fusing of polyphenylene ether that may occur when the inside of the dryer is set to a high temperature.

The loose bulk density of polyphenylene ether obtained after the drying step is 0.2 g/cm$^3$ to 0.6 g/cm$^3$. The lower limit for the loose bulk density is more preferably at least 0.22 g/cm$^3$, and even more preferably at least 0.25 g/cm$^3$. The upper limit for the loose bulk density is more preferably no greater than 0.5 g/cm$^3$, and even more preferably no greater than 0.45 g/cm$^3$.

The amount of residual solvent in polyphenylene ether after the drying (for example, the amount of residual toluene and the like in PPE) is preferably less than 1.5 mass %, more preferably no greater than 0.3 mass %, and even more preferably no greater than 0.1 mass % in consideration of the operating environment in subsequent processing and from a viewpoint of preventing backflow of residual volatile content gas during extrusion processing in order to maintain stable operation.

Examples of effective methods for obtaining polyphenylene ether powder with high efficiency include a method in which the drying temperature is raised, a method in which the degree of vacuum of the drying atmosphere is raised, and a method in which stirring is performed during drying. In particular, the method in which the drying temperature is raised is preferable from a viewpoint of production efficiency. The drying step is preferably carried out using a dryer equipped with a mixing function. The mixing function may be implemented by a stirring-type dryer, a rolling-type dryer, or the like. This increases throughput and maintains high productivity.

The presently disclosed method for producing a polyphenylene ether powder is not limited to the method for producing the polyphenylene ether powder of the present embodiment described above. Moreover, the order, number of repetitions, and so forth of the polymerization step, the precipitation step, the washing step, and the drying step described above may be adjusted as appropriate.

EXAMPLES

The following provides a more specific description of the present embodiment through examples and comparative examples. However, the present embodiment is not limited to the following examples.

Methods used for measuring physical properties, characteristics, and so forth in the examples and comparative examples are described below.

(1) Measurement of Number Average Molecular Weight (Mn)

A Gel Permeation Chromatography System 21 produced by Showa Denko K.K. was used as a measurement device to plot a calibration curve using standard polystyrene. The number average molecular weight (Mn) of an obtained polyphenylene ether powder was then measured based on this calibration curve.

Standard polystyrene having molecular weights of U.S. Pat. Nos. 3,650,000, 2,170,000, 1,090,000, 681,000, 204,000, 52,000, 30,200, 13,800, 3,360, 1,300, and 550 was used.

Two K-805L columns produced by Showa Denko K.K. were connected in series and used as the column.

Measurement was performed with a column temperature of 40° C. and using chloroform as a solvent with a solvent flow rate of 1.0 mL/min.

A 1 g/L chloroform solution of polyphenylene ether was prepared as a measurement sample.

The UV wavelength of the detector was set as 254 nm for standard polystyrene and 283 nm for polyphenylene ether.

(2) Measurement of Loose Bulk Density

A powder tester (Powder Tester Type PT-E produced by Hosokawa Micron) was used to measure the loose bulk density of polyphenylene ether in production and polyphenylene ether powder obtained after production in accordance with the operation manual of the powder tester.

Specifically, the measurement was performed as described below in (2-1) to (2-7).

(2-1) A fixed chute was fitted onto two pins at the front of the casing, and a vibrating chute, a space ring, a sieve (opening size 710 μm), a sieve holder, and a holding bar were attached to a vibration stand in this order and were each fixed using a knob nut.

(2-2) A rectangular vat was placed directly below the fixed chute and a cup for measuring loose apparent specific gravity (hereinafter, referred to simply as a "cup") was placed in a hollow of a table cup-base. In this placement, the centers of the cup and the fixed chute were aligned (note that the weight of the empty cup was weighed in advance).

(2-3) A scoop was used to gently place an appropriate amount of the powder for measurement on the sieve.

(2-4) The vibration/tapping switch was set to VIB. The timer was set fully to the right, and after checking that the rheostat voltage was set to 0, the start button was pressed.

(2-5) The rheostat voltage was gradually raised to cause the powder to flow into the cup. The rheostat voltage was adjusted so that it took approximately 20 seconds to 30 seconds for the powder to form a mound in the cup. Once the mound of powder filled the cup, the rheostat voltage was set to 0 to stop vibration.

(2-6) A vertically oriented blade was used to cut away the side surface of the powder forming the mound filling the cup and then the weight of the powder in the cup (powder weight) was weighed.

(2-7) The loose bulk density (g/cm$^3$) was calculated by dividing the powder weight by 100 since the capacity of the cup was 100 cm$^3$ (cc). The calculated value was recorded.

(3) Analysis of Average Particle Diameter

The volume average particle diameter of the obtained polyphenylene ether powder was measured by a wet method (methanol solvent) using a laser diffraction-scattering particle size analyzer produced by Shimadzu Corporation, which is a particle size analyzer that uses a laser diffraction-scattering method.

A particle diameter corresponding to a middle cumulative value (median diameter) was determined as the average particle diameter (μm) from a cumulative curve of a particle diameter distribution for the volume average particle diameter.

The content of particles having a particle diameter of 105 μm or less in the powder, which was determined in the same way from the cumulative curve of the particle diameter distribution for the volume average particle diameter, was calculated as the fine content (mass %).

(4) Aspect Ratio of Polyphenylene Ether Particles

The aspect ratios of particles were determined using an optical microscope (VHX-1000 Optical Microscope produced by Keyence Corporation). A representative sample of 100 particles was selected from micrographs of particles taken at ×100 magnification. A scale was used to measure the major axis diameter (DL) and the minor axis diameter (DS) of each particle image, and the aspect ratio (DL/DS) was then calculated. Polyphenylene ether particles having a major axis diameter of at least 150 μm were used as evaluation targets.

The sample of 100 particles was observed to determine the proportion (%) of these particles for which DL/DS was 2.0 to 7.0, and also the proportion (%) of these particles for which DL/DS was 3.0 to 5.0. The results are shown in Table 1.

(5) Evaluation of Particle Internal Pores

Pores in individual polyphenylene ether particles of the obtained polyphenylene ether powder were analyzed using a high-resolution 3D X-ray microscope produced by Rigaku Corporation.

In the imaging conditions, the number of projections was 1,000, the exposure time was 8 seconds/projection, and the spatial resolution was 0.54 μm/pix.

The evaluation of pores in individual polyphenylene ether particles was performed by evaluating three randomly selected polyphenylene ether particles selected from the polyphenylene ether powder, which was a collection of polyphenylene ether particles, and taking an average value of these evaluations.

The evaluation of pores was performed by the following procedure.

(5-1) Internal space of a particle (space inward of an outer surface of the particle) was converted to numerical form by image analysis described below. A rectangular parallelepiped section that did not include external space (space outward of the outer surface of the particle) was trimmed in a 3D X-ray image.

(5-2) Region segmentation (binarization) of pore portions (portions occupied by pores) and resin portions (portions occupied by resin) was performed by the percentile method (refer to Doyle, W; (1962); "Operation useful for similarity-invariant pattern recognition"; Journal of the Association for Computing Machinery; Vol. 9; pp. 259-267).

(5-3) Spatial size was determined with respect to the pore portions by the local thickness method (refer to "A new method for the model-independent assessment of thickness in three-dimensional images"; T. Hildebrand and P. Rüegsegger; Journal of Microscopy; Vol. 185; (1996); pp. 67-75).

(5-4) The volume of pore portions having a spatial size of no greater than 6.5 μm, the volume of pore portions having a spatial size exceeding 6.5 μm, and the volume of resin portions were aggregated. The volume (A) of pore portions having a spatial size of no greater than 6.5 μm (noise), the volume (B) of pore portions having a spatial size exceeding 6.5 μm, and the volume (C) of resin portions were used to evaluate the volume of pore portions having a spatial size exceeding 6.5 μm as a percentage (%) relative to the total volume of the particle through calculation using an equation: (B)/{(A)+(C)}.

Note that due to the low true specific gravity of polyphenylene ether, the contrast with air is small, and thus small spaces remain as noise after binarization. Therefore, spaces of no greater than 6.5 μm were regarded as noise and were excluded in calculation of the porosity.

(6) Measurement of Reduced Viscosity ($\eta_{sp}/c$)

A 0.5 g/dL chloroform solution of the polyphenylene ether powder was prepared and the reduced viscosity ($\eta_{sp}/c$) (dL/g) was determined at 30° C. using an Ubbelohde viscosity tube.

(7) Measurement of Dispersibility

A powder tester (Powder Tester Type PT-E produced by Hosokawa Micron) was used to measure the dispersibility of polyphenylene ether in production and obtained polyphenylene ether powder in accordance with the operation manual of the powder tester.

Specifically, the measurement was performed as described below in (7-1) to (7-5).

(7-1) A dispersibility measurement unit was attached to the main body of the powder tester.

(7-2) A rectangular vat was placed at the bottom of a glass circular tube. A space ring was fitted to a shocker bath and then a watch glass was placed thereon. The centers of the glass circular tube and the watch glass were aligned.

(7-3) A hopper at the top of the unit was loaded with 10.0 g of a measurement sample.

(7-4) A lever of the hopper was pushed downward to open a shutter and cause the powder to fall onto the watch glass.

(7-5) The weight of powder remaining on the watch glass was weighed and the dispersibility (%) was determined by the following equation.

Dispersibility (%)={10−Weight of remaining powder (g)}×10

(8) Measurement of Angle of Difference

A powder tester (Powder Tester Type PT-E produced by Hosokawa Micron) was used to measure the angle of difference of polyphenylene ether in production and obtained polyphenylene ether powder in accordance with the operation manual of the powder tester.

Specifically, the measurement was performed as described below in (8-1) to (8-7).

(8-1) A funnel, a space ring, a sieve (opening size 710 μm), a sieve holder, and a holding bar were fitted to a vibration stand in this order and were fixed by knob nuts at both sides.

(8-2) A rectangular vat was placed under the funnel and a table for angle of repose measurement was placed in a hollow of a table cup-base. A shocker was placed in a hollow of a shocker-base of the rectangular vat.

(8-3) An appropriate amount of the powder for measurement was gently loaded onto the sieve and the vibration/tapping switch was set to VIB.

(8-4) The timer was set fully to the right and, after checking that the rheostat voltage was set to 0, the start button was pressed.

(8-5) The rheostat voltage was gradually increased to cause the powder to flow. Once powder started to overflow from the periphery of the table, the rheostat voltage was lowered to reduce the vibration amplitude. Once the angle of repose reached a constant state, the rheostat voltage was set to 0 to stop the flow of powder and the angle of repose was measured using a protractor.

(8-6) A weight was raised to the top of a pole and was then dropped to impart shock on the vat. This was repeated three times and the angle of fall was measured using a protractor.

(8-7) The difference between the angle of repose and the angle of fall was calculated to determine the angle of difference.

(9) Evaluation of Friability

Dried polyphenylene ether powder was added to methanol to prepare a slurry containing 10 mass % of polyphenylene ether.

A jacketed glass tank equipped with four inclined paddle blades was charged with 1 L of the slurry and was stirred for 1 minute at a tip speed of 3.5 m/s. The average particle diameter after stirring was determined by the same procedure as used to analyze the average particle diameter in section (3).

The ratio of the average particle diameter before preparation of the slurry to the average particle diameter after stirring (average particle diameter before slurry preparation/average particle diameter after stirring) was calculated and was taken to be an index of friability. The ratio of the average particle diameter before slurry preparation to the average particle diameter after stirring is at least 1.00, and a larger value indicates finer fracturing.

(10) Evaluation of Powder Flushing Properties

Polyphenylene ether obtained in each of the subsequently described Examples 1 to 13 and Comparative Examples 1 to 5 was used as a raw material to produce polyphenylene ether molten resin under the following conditions.

A twin-screw extruder was used in which the cylinder having the screws inserted therein was composed of blocks (barrels) 1 to 10. A furthest upstream raw material feeding inlet was located at barrel 1, whereas a die head serving as an outlet for molten resin after melt-kneading was located directly after barrel 10. Vacuum vents were located at barrels 4 and 8.

The polyphenylene ether molten resin was obtained through melt-kneading under conditions of a cylinder temperature of 310° C. and a screw rotation speed of 300 rpm.

A twin-screw extruder TEM-58SS (produced by Toshiba Machine Co., Ltd.) was used as the production device and the raw material was fed from a first feeding inlet (top feed) of this twin-screw extruder.

A powder feeding device formed by a weighing feeder and a powder stock hopper was used to feed the raw material to the twin-screw extruder. The powder stock hopper had a capacity of 2000 L. A butterfly valve was used between the powder stock hopper and the weighing feeder. A single auger-type single screw (15.11 m$^3$/m$^3$) having a hopper capacity of 150 L, a screw major diameter D of 37 mmΦ, a screw shaft diameter of 15 mm, a cylinder diameter of 40 mmΦ, a screw pitch of 50 mm (1.35 D), and a screw portion length L of 1 m (27 D) was used for the weighing feeder.

The powder was loaded into the powder stock hopper in advance. A setup was adopted in which the open/close valve of the butterfly valve opened once the level of the weighing feeder reached a lower limit of 20% such that the powder was fed at once to the weighing feeder. Moreover, a setup was adopted in which the open/close valve of the butterfly valve closed once the level of the weighing feeder reached an upper limit of 60%. However, since there was a time lag from the point at which the upper limit for the level of the weighing feeder was exceeded until closing of the open/close valve of the butterfly valve, the powder actually accumulated to a level of 70% to 80%. The feed rate was set as 200 kg/h. The rotation speed of the feeder screw was set as 400 rpm.

The operation described above is referred to as "refilling". In a situation in which powder is fed at once from the powder stock hopper to the weighing feeder in a short time with the aim of shortening the refilling time, this shock may cause flushing of the powder.

Melt-kneading was performed until refilling of the weighing feeder had occurred three times. The flushing properties of the powder were evaluated based on variation of feed rate accuracy of the weighing feeder before and after refilling and change over time of extruder torque.

The flushing properties of the powder were evaluated according to the following evaluation categories.

Good: Variation of weighing feeder feed rate accuracy of 0 to 3 and change over time of extruder torque of ±3 to ±5; large suppressive effect on flushing Inadequate: Variation of weighing feeder feed rate accuracy of at least 4 and change over time of extruder torque of ±5 to ±10; inadequate suppressive effect on flushing Poor: Flushing of powder occurs straight after refilling and extruder operation stops; no suppressive effect on flushing The variation of the feed rate accuracy of the weighing feeder was determined according to the following equation by subtracting the initial accuracy from the feed rate accuracy straight after refilling.

Variation of weighing feeder feed rate accuracy=Feed rate accuracy straight after refilling (kg/h)−Initial (pre-refill) feed rate accuracy (kg/h)

Production Example 1

A 40 L jacketed polymerization tank equipped with a sparger for introduction of an oxygen-containing gas at the bottom of the polymerization tank, a stirring turbine blade, and a baffle, and having a reflux condenser on a vent gas line at the top of the polymerization tank was charged with 4.57 g of cupric oxide, 24.18 g of a 47 mass % hydrogen bromide aqueous solution, 11.00 g of di-t-butylethylenediamine, 62.72 g of di-n-butylamine, 149.92 g of butyldimethylamine, 20.65 kg of toluene, and 3.12 kg of 2,6-dimethylphenol, while blowing nitrogen gas into the polymerization tank at a flow rate of 0.5 L/min. The contents of the polymerization tank were stirred until a homogeneous solution was obtained and the internal temperature of the polymerization tank was 25° C. Next, the sparger was used to introduce dry air into the polymerization tank at a rate of 32.8 NL/min and polymerization was initiated. Passing of dry air was continued for 140 minutes and a polymerization mixture was obtained. The internal temperature during polymerization was controlled to 40° C. The polymerization mixture (polymerization solution) obtained at the end of polymerization was in the form of a homogeneous solution.

Passing of the dry air was stopped and 10 kg of a 2.5 mass % aqueous solution of a tetrasodium salt of ethylenediaminetetraacetic acid (produced by Dojindo Laboratories) was added to the polymerization mixture. The polymerization mixture was stirred for 150 minutes at 70° C. and was then left to stand for 20 minutes. Thereafter, the organic phase and the aqueous phase were separated by liquid-liquid separation.

The separated organic phase was a toluene solution containing 13.1 mass % of polyphenylene ether. This solution is referred to as "polymer solution (1)".

Production Example 2

A polymer solution was produced under the same conditions as in Production Example 1 with the exception that the molecular weight was controlled by setting the time for which dry air was passed as 125 minutes and changing the polymerization time. The obtained polymer solution is referred to as "polymer solution (2)".

Production Example 3

A 40 L jacketed polymerization tank equipped with a sparger for introduction of an oxygen-containing gas at the bottom of the polymerization tank, a stirring turbine blade, and a baffle, and having a reflux condenser on a vent gas line at the top of the polymerization tank was charged with 4.02 g of cupric oxide, 29.876 g of a 47 mass % hydrogen bromide aqueous solution, 9.684 g of di-t-butylethylenediamine, 46.88 g of di-n-butylamine, 122.28 g of butyldimethylamine, 17.53 kg of toluene, and 1.5 kg of 2,6-dimethylphenol, while blowing nitrogen gas into the polymerization tank at a flow rate of 0.5 L/min. The contents of the polymerization tank were stirred until a homogeneous solution was obtained and the internal temperature of the polymerization tank was 25° C. Next, the sparger was used to introduce dry air into the polymerization tank at a rate of 32.8 NL/min and, at the same time, 1.62 kg of 2,6-dimethylphenol and a solution comprising 3.12 kg of toluene were added to the polymerization tank over 30 minutes using a plunger pump. Passing of dry air was continued for 86 minutes and a polymerization mixture was obtained. The internal temperature of the polymerization tank during polymerization was controlled to 40° C. The polymerization mixture (polymerization solution) obtained at the end of polymerization was in the form of a homogeneous solution.

Passing of the dry air was stopped and 10 kg of a 2.5 mass % aqueous solution of a tetrasodium salt of ethylenediaminetetraacetic acid (produced by Dojindo Laboratories) was added to the polymerization mixture. The polymerization mixture was stirred for 150 minutes at 70° C. and was then left to stand for 20 minutes. Thereafter, the organic phase and the aqueous phase were separated by liquid-liquid separation.

The separated organic phase was a toluene solution containing 13.1 mass % of polyphenylene ether. This solution is referred to as "polymer solution (3)".

Example 1

The polymer solution (1) obtained in Production Example 1 was charged to a jacketed mixing tank and was heated by causing a 120° C. heating medium to flow in the jacket. Produced vapor having toluene as a main component was cooled by a condenser and the toluene was removed from the system to concentrate the solution until the polymer concentration in the mixing tank reached 30 mass %. This operation was repeated to produce a polymer solution having a polymer concentration of 30 mass %.

Next, polymer precipitation was carried out using a jacketed precipitation tank equipped with a draft tube and four-blade inclined paddle blade as described in Example 1 of WO 2003/064499 A1.

Note that the precipitation tank also had four baffles provided externally to the draft tube. The amount of liquid in the precipitation tank during operation thereof was 1100 mL. The precipitation tank was charged with 500 g of toluene and 550 g of n-hexane, which were then stirred at 1500 rpm (impeller diameter=67 mm, tip speed=5.3 m/s).

The precipitation tank was also provided with an overflow line and was configured such that liquid in the precipitation tank overflowed and was removed from the tank when the amount thereof exceeded 1100 mL. A feed line was provided at the same position as described in Example 1 of WO 2003/064499 A1.

The precipitation tank was set to 20° C. and 364 g/min of n-hexane and 174 g/min of the 30 mass % polymer solution were added (fed) into the precipitation tank over 30 minutes.

Rotation of the paddle blade at 1500 rpm was continued. A slurry obtained through precipitation of polyphenylene ether was discharged from the precipitation tank at 538 g/min and was fed to a washing tank using a slurry pump.

A separate line was used to feed 122 g/min of n-hexane to the washing tank. The n-hexane was stirred with the slurry to perform displacement washing of toluene in the polyphenylene ether particles. As a result, a washed slurry having a slurry concentration of 7.9 mass % was produced.

The slurry was divided into 10 kg portions and was then filtered using a basket-type centrifuge (Model 0-15 produced by Tanabe Willtec Inc.).

After each filtration, n-hexane was sprayed at the wet polyphenylene ether in the basket-type centrifuge such that the ratio (b/a) of n-hexane (b) to polymer (a) was 2.0, and filtration was performed again to obtain wet polyphenylene ether. This washing operation was performed twice.

Next, the wet polyphenylene ether was held for 60 minutes at 130° C. and 1 mmHg to obtain a polyphenylene ether powder in a dry state.

Example 2

The polymer solution (1) obtained in Production Example 1 was concentrated to 25 mass % by the same concentration method as described in Example 1.

The poor solvent and the polymer solution fed to the precipitation tank were set as 369 g/min of n-hexane and 164 g/min of the above-described polymer solution, respectively, fed over 30 minutes. The poor solvent fed to the washing tank was set as 123 g/min of n-hexane. With regards to other conditions, the same procedure as described in Example 1 was implemented to obtain a polyphenylene ether powder, as shown in Table 1.

Measurements of the obtained polyphenylene ether powder were performed by the previously described methods. Results of the measurements are shown in Table 1.

Example 3

The polymer solution (1) obtained in Production Example 1 was concentrated to 45 mass % by the same concentration method as described in Example 1.

The poor solvent and the polymer solution fed to the precipitation tank were set as 346 g/min of n-hexane and 210 g/min of the above-described polymer solution, respectively, fed over 30 minutes. The poor solvent fed to the washing tank was set as 116 g/min of n-hexane. With regards to other conditions, the same procedure as described in Example 1 was implemented to obtain a polyphenylene ether powder, as shown in Table 1.

Measurements of the obtained polyphenylene ether powder were performed by the previously described methods. Results of the measurements are shown in Table 1.

Example 4

The procedure described in Example 3 was followed with the exception that the stirring rotational speed of the precipitation tank was changed to 500 rpm (tip speed=1.75 m/s).

Measurements of the obtained polyphenylene ether powder were performed by the previously described methods. Results of the measurements are shown in Table 1.

Example 5

The procedure described in Example 3 was followed with the exception that the stirring rotational speed of the precipitation tank was changed to 2000 rpm (tip speed=7.0 m/s).

Measurements of the obtained polyphenylene ether powder were performed by the previously described methods. Results of the measurements are shown in Table 1.

Example 6

The polymer solution (1) obtained in Production Example 1 was concentrated to 45 mass % by the same concentration method as described in Example 1.

The poor solvent and the polymer solution fed to the precipitation tank were set as 284 g/min of n-hexane and 303 g/min of the above-described polymer solution, respectively, fed over 30 minutes. The poor solvent fed to the washing tank was set as 168 g/min of n-hexane. With regards to other conditions, the same procedure as described in Example 1 was implemented to obtain a polyphenylene ether powder, as shown in Table 1.

Measurements of the obtained polyphenylene ether powder were performed by the previously described methods. Results of the measurements are shown in Table 1.

Example 7

The polymer solution (1) obtained in Production Example 1 was concentrated to 45 mass % by the same concentration method as described in Example 1.

The poor solvent and the polymer solution fed to the precipitation tank were set as 328 g/min of n-hexane and 238 g/min of the above-described polymer solution, respectively, fed over 30 minutes. The poor solvent fed to the washing tank was set as 132 g/min of n-hexane. With regards to other conditions, the same procedure as described in Example 1 was implemented to obtain a polyphenylene ether powder, as shown in Table 1.

Measurements of the obtained polyphenylene ether powder were performed by the previously described methods. Results of the measurements are shown in Table 1.

Example 8

The procedure described in Example 3 was followed with the exception that the temperature in the precipitation tank was changed to −10° C.

Measurements of the obtained polyphenylene ether powder were performed by the previously described methods. Results of the measurements are shown in Table 1.

Example 9

The procedure described in Example 3 was followed with the exception that the poor solvent and washing solvent that were used were changed to n-heptane.

Measurements of the obtained polyphenylene ether powder were performed by the previously described methods. Results of the measurements are shown in Table 1.

Example 10

The polymer solution (1) obtained in Production Example 1 was concentrated to 45 mass % by the same concentration method as described in Example 1.

The poor solvent and the polymer solution fed to the precipitation tank were set as 302 g/min of a pre-prepared n-hexane/methanol mixed liquid and 171 g/min of the above-described polymer solution, respectively, fed over 30 minutes. The amount of methanol was adjusted such that the methanol content in the precipitation tank was 5 mass % relative to the amount of all solvents. The poor solvent fed to the washing tank was set as 95 g/min of hexane. With regards to other conditions, the same procedure as described in Example 1 was implemented to obtain a polyphenylene ether powder, as shown in Table 1.

Measurements of the obtained polyphenylene ether powder were performed by the previously described methods. Results of the measurements are shown in Table 1.

Example 11

The polymer solution (1) obtained in Production Example 1 was concentrated to 45 mass % by the same concentration method as described in Example 1.

The poor solvent and the polymer solution fed to the precipitation tank were set as 360 g/min of a pre-prepared n-hexane/water mixed liquid and 204 g/min of the above-described polymer solution, respectively, fed over 30 minutes. The amount of water was adjusted such that the water content in the precipitation tank was 5 mass % relative to the amount of all solvents. The poor solvent fed to the washing tank was set as 113 g/min of hexane. With regards to other conditions, the same procedure as described in Example 1 was implemented to obtain a polyphenylene ether powder, as shown in Table 1. Measurements of the obtained polyphenylene ether powder were performed by the previously described methods. Results of the measurements are shown in Table 1.

Example 12

The polymer solution (2) obtained in Production Example 2 was concentrated to 45 mass % by the same concentration method as described in Example 1.

The poor solvent and the polymer solution fed to the precipitation tank were set as 346 g/min of n-hexane and 210 g/min of the above-described polymer solution, respectively, fed over 30 minutes. The poor solvent fed to the washing tank was set as 116 g/min of n-hexane. With regards to other conditions, the same procedure as described in Example 1 was implemented to obtain a polyphenylene ether powder, as shown in Table 1.

Measurements of the obtained polyphenylene ether powder were performed by the previously described methods. Results of the measurements are shown in Table 1.

Example 13

The polymer solution (3) obtained in Production Example 3 was concentrated to 45 mass % by the same concentration method as described in Example 1.

The poor solvent and the polymer solution fed to the precipitation tank were set as 346 g/min of n-hexane and 210 g/min of the above-described polymer solution, respectively, fed over 30 minutes. The poor solvent fed to the washing tank was set as 116 g/min of n-hexane. With regards to other conditions, the same procedure as described in Example 1 was implemented to obtain a polyphenylene ether powder, as shown in Table 1.

Measurements of the obtained polyphenylene ether powder were performed by the previously described methods. Results of the measurements are shown in Table 1.

Example 14

The polymer solution (1) obtained in Production Example 1 was concentrated to 45 mass % by the same concentration method as described in Example 1.

The poor solvent and the polymer solution fed to the precipitation tank were set as 379 g/min of dibutyl ether and 230 g/min of the above-described polymer solution, respectively, fed over 30 minutes. The poor solvent fed to the washing tank was set as 104 g/min of dibutyl ether. With regards to other conditions, the same procedure as described in Example 1 was implemented to obtain a polyphenylene ether powder, as shown in Table 1. Measurements of the obtained polyphenylene ether powder were performed by the previously described methods. Results of the measurements are shown in Table 1.

Comparative Example 1

The procedure described in Example 3 was followed with the exception that the temperature in the precipitation tank was changed to 50° C.

Measurements of the obtained polyphenylene ether powder were performed by the previously described methods. Results of the measurements are shown in Table 1.

Comparative Example 2

The procedure described in Example 3 was followed with the exception that the stirring rotational speed of the precipitation tank was changed to 2500 rpm (tip speed=8.8 m/s).

Measurements of the obtained polyphenylene ether powder were performed by the previously described methods. Results of the measurements are shown in Table 1.

Comparative Example 3

The polymer solution (1) obtained in Production Example 1 was concentrated to 45 mass % by the same concentration method as described in Example 1.

The poor solvent and the polymer solution fed to the precipitation tank were set as 385 g/min of methanol and 233 g/min of the above-described polymer solution, respectively, fed over 30 minutes. The poor solvent fed to the washing tank was set as 129 g/min of methanol. After filtration of the slurry, methanol was sprayed at the wet polyphenylene ether in the basket-type centrifuge such that the ratio (b/a) of methanol (b) to polymer (a) was 2.0, and filtration was performed again to obtain wet polyphenylene ether. This washing operation was performed twice. With regards to other conditions, the same procedure as described in Example 1 was implemented to obtain a polyphenylene ether powder, as shown in Table 1.

Measurements of the obtained polyphenylene ether powder were performed by the previously described methods. Results of the measurements are shown in Table 1.

Comparative Example 4

The polymer solution (1) obtained in Production Example 1 was concentrated to 45 mass % by the same concentration method as described in Example 1.

The poor solvent and the polymer solution fed to the precipitation tank were set as 362 g/min of a pre-prepared acetone/water mixed liquid and 197 g/min of the above-described polymer solution, respectively, fed over 30 minutes. The amount of water was adjusted such that the water content in the precipitation tank was 8 mass % relative to the amount of all solvents. The poor solvent fed to the washing tank was set as 108 g/min of acetone. After filtration of the slurry, acetone was sprayed at the wet polyphenylene ether in the basket-type centrifuge such that the ratio (b/a) of acetone (b) to polymer (a) was 2.0, and filtration was performed again to obtain wet polyphenylene ether. This washing operation was performed twice. With regards to other conditions, the same procedure as described in Example 1 was implemented to obtain a polyphenylene ether powder, as shown in Table 1.

Measurements of the obtained polyphenylene ether powder were performed by the previously described methods. Results of the measurements are shown in Table 1.

Comparative Example 5

The polymer solution (1) obtained in Production Example 1 was concentrated to 45 mass % by the same concentration method as described in Example 1.

The poor solvent and the polymer solution fed to the precipitation tank were set as 191 g/min of n-hexane and 434 g/min of the above-described polymer solution, respectively, fed over 30 minutes. The poor solvent fed to the washing tank was set as 239 g/min of n-hexane. With regards to other conditions, the same procedure as described in Example 1 was implemented to obtain a polyphenylene ether powder, as shown in Table 1.

Measurements of the obtained polyphenylene ether powder were performed by the previously described methods. Results of the measurements are shown in Table 1.

TABLE 1

| | | (Units) | Example 1 | Example 2 | Example 3 | Example 4 | Example 5 | Example 6 |
|---|---|---|---|---|---|---|---|---|
| Polymerization step | Type of polymer solution | | Production Example 1 | Production Example 1 | Production Example 1 | Production Example 1 | Production Example 1 | Production Example 1 |
| Concentration step | Polymer solution concentration | (Mass %) | 30 | 25 | 45 | 45 | 45 | 45 |
| Precipitation step | Precipitation temperature | (° C.) | 20 | 20 | 20 | 20 | 20 | 20 |
| | Poor solvent | (—) | Hexane | Hexane | Hexane | Hexane | Hexane | Hexane |
| | SP value of poor solvent | $(J/cm^3)^{1/2}$ | 14.94 | 14.94 | 14.94 | 14.94 | 14.94 | 14.94 |
| | | $(cal/cm^3)^{1/2}$ | 7.3 | 7.3 | 7.3 | 7.3 | 7.3 | 7.3 |

TABLE 1-continued

| | | (Units) | | | | | | |
|---|---|---|---|---|---|---|---|---|
| | Initially charged poor solvent/Initially charged good solvent (mass ratio) | (—) | 1.1 | 1.1 | 1.1 | 1.1 | 1.1 | 1.1 |
| | Added poor solvent/Added good solvent (mass ratio) | (—) | 3 | 3 | 3 | 3 | 3 | 1.7 |
| | Additive | (—) | — | — | — | — | — | — |
| | Additive content (among all solvents) | (Mass %) | 0 | 0 | 0 | 0 | 0 | 0 |
| | Impeller tip speed | (m/s) | 5.3 | 5.3 | 5.3 | 1.75 | 7.0 | 5.3 |
| Washing step | Poor solvent | (—) | Hexane | Hexane | Hexane | Hexane | Hexane | Hexane |
| | Poor solvent/Polymer (mass ratio) | (—) | 2.0 | 2.0 | 2.0 | 2.0 | 2.0 | 2.0 |
| Evaluation of PPE powder | (1) Number average molecular weight (Mn) | (—) | 17800 | 17800 | 17900 | 17900 | 17900 | 17700 |
| | (6) Reduced viscosity | (dL/g) | 0.51 | 0.51 | 0.51 | 0.51 | 0.51 | 0.51 |
| | (3) Average particle diameter | (μm) | 480 | 650 | 670 | 690 | 580 | 390 |
| | Fine content | (Mass %) | 3 | 4 | 2 | 2 | 2 | 3 |
| | (4) Proportion of particles for which DL/DS is 2.0 to 7.0 | (%) | 84 | 85 | 84 | 85 | 84 | 85 |
| | Proportion of particles for which DL/DS is 3.0 to 5.0 | (%) | 79 | 77 | 76 | 77 | 76 | 74 |
| | (2) Loose bulk density | (g/cm$^3$) | 0.37 | 0.4 | 0.4 | 0.4 | 0.4 | 0.38 |
| | (5) Porosity: Volume of pores exceeding 6.5 μm in diameter as proportion of total particle volume in individual particles | (%) | 0.1 | 0.2 | 0 | 0 | 0 | 0.1 |
| | (8) Angle of difference | (°) | 15 | 15 | 15 | 16 | 14 | 15 |
| | (7) Dispersibility | (%) | 11 | 10 | 10 | 11 | 11 | 10 |
| | (9) Average particle diameter after slurry stirring | (μm) | 346 | 450 | 440 | 484 | 393 | 310 |
| | Average particle diameter before slurry stirring/Average particle diameter after slurry stirring | (—) | 1.39 | 1.44 | 1.52 | 1.43 | 1.48 | 1.26 |
| | (10) Initial accuracy of weighing feeder feed rate | (kg/h) | ±2 | ±2 | ±2 | ±2 | ±2 | ±2 |
| | Accuracy of weighing feeder feed rate straight after refilling | (kg/h) | ±2 | ±2 | ±2 | ±2 | ±2 | ±2 |
| | Variation of weighing feeder feed rate accuracy | (kg/h) | 0 | 0 | 0 | 0 | 0 | 0 |
| | Change over time of extruder torque | (%) | ±3 | ±3 | ±3 | ±3 | ±3 | ±3 |
| | Flushing properties | (—) | Good | Good | Good | Good | Good | Good |

| | | (Units) | Example 7 | Example 8 | Example 9 | Example 10 | Example 11 | Example 12 |
|---|---|---|---|---|---|---|---|---|
| Polymerization step | Type of polymer solution | | Production Example 1 | Production Example 1 | Production Example 1 | Production Example 1 | Production Example 1 | Production Example 2 |
| Concentration step | Polymer solution concentration | (Mass %) | 45 | 45 | 45 | 45 | 45 | 45 |
| Precipitation step | Precipitation temperature | (° C.) | 20 | −10 | 20 | 20 | 20 | 20 |
| | Poor solvent | (—) | Hexane | Hexane | Heptane | Hexane | Hexane | Hexane |
| | SP value of poor solvent | (J/cm$^3$)$^{1/2}$ | 14.94 | 14.94 | 15.14 | 14.94 | 14.94 | 14.94 |
| | | (cal/cm$^3$)$^{1/2}$ | 7.3 | 7.3 | 7.4 | 7.3 | 7.3 | 7.3 |
| | Initially charged poor solvent/Initially charged good solvent (mass ratio) | (—) | 1.1 | 1.1 | 1.1 | 1.1 | 1.1 | 1.1 |
| | Added poor solvent/Added good solvent (mass ratio) | (—) | 2.5 | 3 | 3 | 3 | 3 | 3 |
| | Additive | (—) | — | — | — | Methanol | Water | — |
| | Additive content (among all solvents) | (Mass %) | 0 | 0 | 0 | 5 | 5 | 0 |
| | Impeller tip speed | (m/s) | 5.3 | 5.3 | 5.3 | 5.3 | 5.3 | 5.3 |
| Washing step | Poor solvent | (—) | Hexane | Hexane | Heptane | Hexane | Hexane | Hexane |
| | Poor solvent/Polymer (mass ratio) | (—) | 2.0 | 2.0 | 2.0 | 2.0 | 2.0 | 2.0 |
| Evaluation of PPE powder | (1) Number average molecular weight (Mn) | (—) | 17800 | 17600 | 17900 | 17800 | 17800 | 15100 |
| | (6) Reduced viscosity | (dL/g) | 0.51 | 0.5 | 0.51 | 0.51 | 0.51 | 0.42 |
| | (3) Average particle diameter | (μm) | 610 | 700 | 655 | 668 | 989 | 700 |
| | Fine content | (Mass %) | 4 | 2 | 3 | 1.9 | 1.5 | 2 |
| | (4) Proportion of particles for which DL/DS is 2.0 to 7.0 | (%) | 84 | 85 | 80 | 79 | 80 | 85 |
| | Proportion of particles for which DL/DS is 3.0 to 5.0 | (%) | 74 | 74 | 75 | 69 | 75 | 77 |
| | (2) Loose bulk density | (g/cm$^3$) | 0.4 | 0.4 | 0.4 | 0.41 | 0.38 | 0.4 |
| | (5) Porosity: Volume of pores exceeding 6.5 μm in diameter as proportion of total particle volume in individual particles | (%) | 0.5 | 0 | 0.2 | 1.0 | 0 | 0.1 |
| | (8) Angle of difference | (°) | 15 | 14 | 15 | 16 | 16 | 15 |
| | (7) Dispersibility | (%) | 10 | 10 | 12 | 10 | 11 | 10 |
| | (9) Average particle diameter after slurry stirring | (μm) | 414 | 480 | 441 | 457 | 662 | 469 |
| | Average particle diameter before slurry stirring/Average particle diameter after slurry stirring | (—) | 1.47 | 1.46 | 1.49 | 1.46 | 1.49 | 1.49 |
| | (10) Initial accuracy of weighing feeder feed rate | (kg/h) | ±2 | ±2 | ±2 | ±2 | ±2 | ±2 |
| | Accuracy of weighing feeder feed rate straight after refilling | (kg/h) | ±2 | ±2 | ±2 | ±2 | ±2 | ±2 |

TABLE 1-continued

| | | (Units) | | | | | | |
|---|---|---|---|---|---|---|---|---|
| | Variation of weighing feeder feed rate accuracy | (kg/h) | 0 | 0 | 0 | 0 | 0 | 0 |
| | Change over time of extruder torque | (%) | ±3 | ±3 | ±3 | ±3 | ±3 | ±3 |
| | Flushing properties | (—) | Good | Good | Good | Good | Good | Good |

| | | (Units) | Example 13 | Example 14 | Comparative Example 1 | Comparative Example 2 | Comparative Example 3 |
|---|---|---|---|---|---|---|---|
| Polymerization step | Type of polymer solution | | Production Example 3 | Production Example 1 | Production Example 1 | Production Example 1 | Production Example 1 |
| Concentration step | Polymer solution concentration | (Mass %) | 45 | 45 | 45 | 45 | 45 |
| Precipitation step | Precipitation temperature | (° C.) | 20 | 20 | 50 | 20 | 20 |
| | Poor solvent | (—) | Hexane | Dibutyl ether | Hexane | Hexane | Methanol |
| | SP value of poor solvent | (J/cm³)^(1/2) | 14.94 | 15.96 | 14.94 | 14.94 | 29.67 |
| | | (cal/cm³)^(1/2) | 7.3 | 7.8 | 7.3 | 7.3 | 14.5 |
| | Initially charged poor solvent/Initially charged good solvent (mass ratio) | (—) | 1.1 | 1.1 | 1.1 | 1.1 | 1.1 |
| | Added poor solvent/Added good solvent (mass ratio) | (—) | 3 | 3 | 3 | 3 | 3 |
| | Additive | (—) | — | — | — | — | — |
| | Additive content (among all solvents) | (Mass %) | 0 | 0 | 0 | 0 | 0 |
| | Impeller tip speed | (m/s) | 5.3 | 5.3 | 5.3 | 8.8 | 5.3 |
| Washing step | Poor solvent | (—) | Hexane | Dibutyl ether | Hexane | Hexane | Methanol |
| | Poor solvent/Polymer (mass ratio) | (—) | 2.0 | 2.0 | 2.0 | 2.0 | 2.0 |
| Evaluation of PPE powder | (1) Number average molecular weight (Mn) | (—) | 11100 | 17800 | 17800 | 17800 | 17800 |
| | (6) Reduced viscosity | (dL/g) | 0.35 | 0.51 | 0.51 | 0.51 | 0.51 |
| | (3) Average particle diameter | (μm) | 820 | 700 | 550 | 297 | 850 |
| | Fine content | (Mass %) | 1.7 | 2 | 8 | 10 | 3 |
| | (4) Proportion of particles for which DL/DS is 2.0 to 7.0 | (%) | 84 | 80 | 0 | 0 | 0 |
| | Proportion of particles for which DL/DS is 3.0 to 5.0 | (%) | 76 | 75 | 0 | 0 | 0 |
| | (2) Loose bulk density | (g/cm³) | 0.4 | 0.39 | 0.3 | 0.4 | 0.43 |
| | (5) Porosity: Volume of pores exceeding 6.5 μm in diameter as proportion of total particle volume in individual particles | (%) | 0.1 | 0.3 | 1.4 | 0.2 | 2.9 |
| | (8) Angle of difference | (°) | 15 | 17 | 21 | 21 | 20 |
| | (7) Dispersibility | (%) | 10 | 18 | 49 | 53 | 54 |
| | (9) Average particle diameter after slurry stirring | (μm) | 549 | 430 | 320 | 196 | 53 |
| | Average particle diameter before slurry stirring/Average particle diameter after slurry stirring | (—) | 1.49 | 1.63 | 1.72 | 1.52 | 16.04 |
| | (10) Initial accuracy of weighing feeder feed rate | (kg/h) | ±2 | ±2 | ±2 | ±2 | ±2 |
| | Accuracy of weighing feeder feed rate straight after refilling | (kg/h) | ±2 | ±2 | ±10 | ±9 | Flushing |
| | Variation of weighing feeder feed rate accuracy | (kg/h) | 0 | 0 | 8 | 7 | Not measurable |
| | Change over time of extruder torque | (%) | ±3 | ±5 | ±7 | ±7 | Operation stopped |
| | Flushing properties | (—) | Good | Good | Inadequate | Inadequate | Poor |

| | | (Units) | Comparative Example 4 | Comparative Example 5 |
|---|---|---|---|---|
| Polymerization step | Type of polymer solution | | Production Example 1 | Production Example 1 |
| Concentration step | Polymer solution concentration | (Mass %) | 45 | 45 |
| Precipitation step | Precipitation temperature | (° C.) | 20 | 20 |
| | Poor solvent | (—) | Acetone | Hexane |
| | SP value of poor solvent | (J/cm³)^(1/2) | 20.26 | 14.94 |
| | | (cal/cm³)^(1/2) | 9.9 | 7.3 |
| | Initially charged poor solvent/Initially charged good solvent (mass ratio) | (—) | 1.1 | 1.1 |
| | Added poor solvent/Added good solvent (mass ratio) | (—) | 2.9 | 0.8 |
| | Additive | (—) | Water | — |
| | Additive content (among all solvents) | (Mass %) | 8 | 0 |
| | Impeller tip speed | (m/s) | 5.3 | 5.3 |
| Washing step | Poor solvent | (—) | Acetone | Hexane |
| | Poor solvent/Polymer (mass ratio) | (—) | 2.0 | 2.0 |
| Evaluation of PPE powder | (1) Number average molecular weight (Mn) | (—) | 17800 | 17800 |
| | (6) Reduced viscosity | (dL/g) | 0.51 | 0.51 |
| | (3) Average particle diameter | (μm) | 850 | 131 |
| | Fine content | (Mass %) | 5 | 45 |
| | (4) Proportion of particles for which DL/DS is 2.0 to 7.0 | (%) | 0 | 0 |

TABLE 1-continued

| | | | | |
|---|---|---|---|---|
| | Proportion of particles for which DL/DS is 3.0 to 5.0 | (%) | 0 | 0 |
| | (2) Loose bulk density | (g/cm³) | 0.43 | 0.4 |
| | (5) Porosity: Volume of pores exceeding 6.5 μm in diameter as proportion of total particle volume in individual particles | (%) | 2.9 | 1.1 |
| | (8) Angle of difference | (°) | 19 | 21 |
| | (7) Dispersibility | (%) | 48 | 60 |
| (9) | Average particle diameter after slurry stirring | (μm) | 262 | 87 |
| | Average particle diameter before slurry stirring/Average particle diameter after slurry stirring | (—) | 3.24 | 1.51 |
| (10) | Initial accuracy of weighing feeder feed rate | (kg/h) | ±2 | ±2 |
| | Accuracy of weighing feeder feed rate straight after refilling | (kg/h) | Flushing | ±10 |
| | Variation of weighing feeder feed rate accuracy | (kg/h) | Not measurable | 8 |
| | Change over time of extruder torque | (%) | Operation stopped | ±7 |
| | Flushing properties | (—) | Poor | Inadequate |

Notations used in Table 1 have the following meanings.

Polymer solution concentration: Solid content concentration (mass %) in toluene solution of polyphenylene ether Precipitation temperature: Jacket temperature of precipitation tank Added poor solvent/Added good solvent: Mass ratio of poor solvent having solubility parameter value of less than 9 $(cal/cm^3)^{1/2}$ ($18.41$ $(J/cm^3)^{1/2}$) added to precipitation tank in precipitation step relative to good solvent in polyphenylene ether solution added to precipitation tank in precipitation step Additive content: Amount (mass %) of poor solvent having solubility parameter value of at least 9 $(cal/cm^3)^{1/2}$ ($18.41$ $(J/cm^3)^{1/2}$) relative to all solvents in precipitation tank Poor solvent/Polymer: Mass ratio of poor solvent for washing relative to separated polyphenylene ether solid content in washing step Table 1 shows that in each of Examples 1 to 14, a collection of polyphenylene ether particles was obtained for which the aspect ratio (DL/DS), expressing the ratio of the major axis diameter (DL) to the minor axis diameter (DS) of an individual particle, was 2.0 to 7.0. Moreover, low porosity and dispersibility, and a small angle of difference were obtained in these examples, and thus low susceptibility to fracturing and suppressed flushability are anticipated. When melt-kneading of these powders was performed using the extruder and weighing feeder, the feed rate of the weighing feeder and the torque of the extruder were stable, and flushing was suppressed.

Comparative Examples 1 and 2 demonstrate that elongated particles were not obtained when the precipitation tank temperature was high or the tip speed of the precipitation tank impeller was high.

Comparative Examples 3 and 4 demonstrate that when methanol and acetone, which are poor solvents having a solubility parameter value of at least 9 $(cal/cm^3)^{1/2}$ ($18.41$ $(J/cm^3)^{1/2}$), were used alone as a poor solvent, the resultant particles had high porosity and were brittle, and thus had high susceptibility to pulverization. Moreover, the aspect ratio of these particles was close to 1 and the particles exhibited high flushability.

Comparative Example 5 demonstrates that when only a small amount of a poor solvent having a solubility parameter value of less than 9 $(cal/cm^3)^{1/2}$ ($18.41$ $(J/cm^3)^{1/2}$) was added to the precipitation tank, the aspect ratio of the resultant particles was close to 1.

When melt-kneading of the powders in Comparative Examples 1 to 5 was performed using the extruder and weighing feeder, the feed rate of the weighing feeder and the torque of the extruder were unstable due to these powders exhibiting high flushability.

INDUSTRIAL APPLICABILITY

The presently disclosed production method is industrially applicable as a technique capable of producing elongated polyphenylene ether powder that exhibits low susceptibility to pulverization and suppressed flushability.

The presently disclosed polyphenylene ether powder has excellent handleability and is, therefore, suitable for use in production of products that are produced using a polyphenylene ether powder as a raw material.

The invention claimed is:

1. A polyphenylene ether powder comprising
    one or more elongated polyphenylene ether particles having an aspect ratio (DL/DS), expressing a ratio of a major axis diameter (DL) to a minor axis diameter (DS) of an individual particle, of 2.0 to 7.0, wherein
    the elongated polyphenylene ether particles are free of cracks, and
    the elongated polyphenylene ether particles having an aspect ratio of 2.0 to 7.0 have a content of at least 70%.

2. The polyphenylene ether powder of claim 1 having an average particle diameter of 200 μm to 1000 μm.

3. The polyphenylene ether powder of claim 1, wherein in an individual particle of the polyphenylene ether powder, the volume of pores exceeding 6.5 μm in diameter is 0% to 1.5% of total volume.

4. The polyphenylene ether powder of claim 1, wherein the elongated polyphenylene ether particles having an aspect ratio of 3.0 to 5.0 have a content of at least 65%.

5. A method for producing the polyphenylene ether powder of claim 1, comprising
    mixing a polyphenylene ether solution containing polyphenylene ether and a good solvent for polyphenylene ether with a poor solvent for polyphenylene ether at −80° C. to 30° C. to precipitate polyphenylene ether particles and form a slurry, wherein the poor solvent for polyphenylene ether includes a poor solvent having a solubility parameter value of less than 18.41 $(J/cm^3)^{1/2}$.

6. The method of claim 5, wherein
the good solvent for polyphenylene ether is at least one selected from the group consisting of benzene, toluene, and xylene.

7. The method of claim 5, wherein
the poor solvent having a solubility parameter value of less than 18.41 $(J/cm^3)^{1/2}$ is at least one selected from hydrocarbon solvents and ether solvents.

8. The method of claim 5, wherein
the poor solvent having a solubility parameter value of less than 18.41 $(J/cm^3)^{1/2}$ is at least one selected from hydrocarbon solvents.

9. The method of claim 5, wherein
100 mass % of the polyphenylene ether solution has a polyphenylene ether concentration of 20 mass % to 50 mass %.

10. The method of claim 5, wherein
in the mixing, a poor solvent having a solubility parameter value of at least 18.41 $(J/cm^3)^{1/2}$ is contained in an amount of 0.05 mass % to 10 mass % relative to all solvents when a total amount of good and poor solvents is taken to be 100 mass %.

11. The method of claim 10, wherein
the poor solvent having a solubility parameter value of at least 18.41 $(J/cm^3)^{1/2}$ is at least one selected from the group consisting of methanol, ethanol, isopropanol, acetone, methyl ethyl ketone, and water.

12. The method of claim 5, wherein
the mixing is performed by stirring through rotation of an impeller at a tip speed of 1.7 m/s to 7.0 m/s.

13. The method of claim 5, wherein
the mixing is performed by adding the polyphenylene ether solution and the poor solvent for polyphenylene ether to an initially charged liquid that is a mixed liquid of a good solvent for polyphenylene ether and a poor solvent for polyphenylene ether, and
a mass ratio of the poor solvent having a solubility parameter value of less than 18.41 $(J/cm^3)^{1/2}$ included in the poor solvent that is added relative to the good solvent in the polyphenylene ether solution that is added is in a range of 0.9 to 4.0.

14. The method of claim 10, wherein the mixing is performed by stirring through rotation of an impeller at a tip speed of 1.7 m/s to 7.0 m/s.

15. The method of claim 10, wherein the mixing is performed by adding the polyphenylene ether solution and the poor solvent for polyphenylene ether to an initially charged liquid that is a mixed liquid of a good solvent for polyphenylene ether and a poor solvent for polyphenylene ether, and
a mass ratio of the poor solvent having a solubility parameter value of less than 18.41 $(J/cm^3)^{1/2}$ included in the poor solvent that is added relative to the good solvent in the polyphenylene ether solution that is added is in a range of 0.9 to 4.0.

* * * * *